C. S. OLDROYD.
MINING MACHINE.
APPLICATION FILED MAY 5, 1916.
1,365,598.
Patented Jan. 11, 1921.
16 SHEETS—SHEET 5.
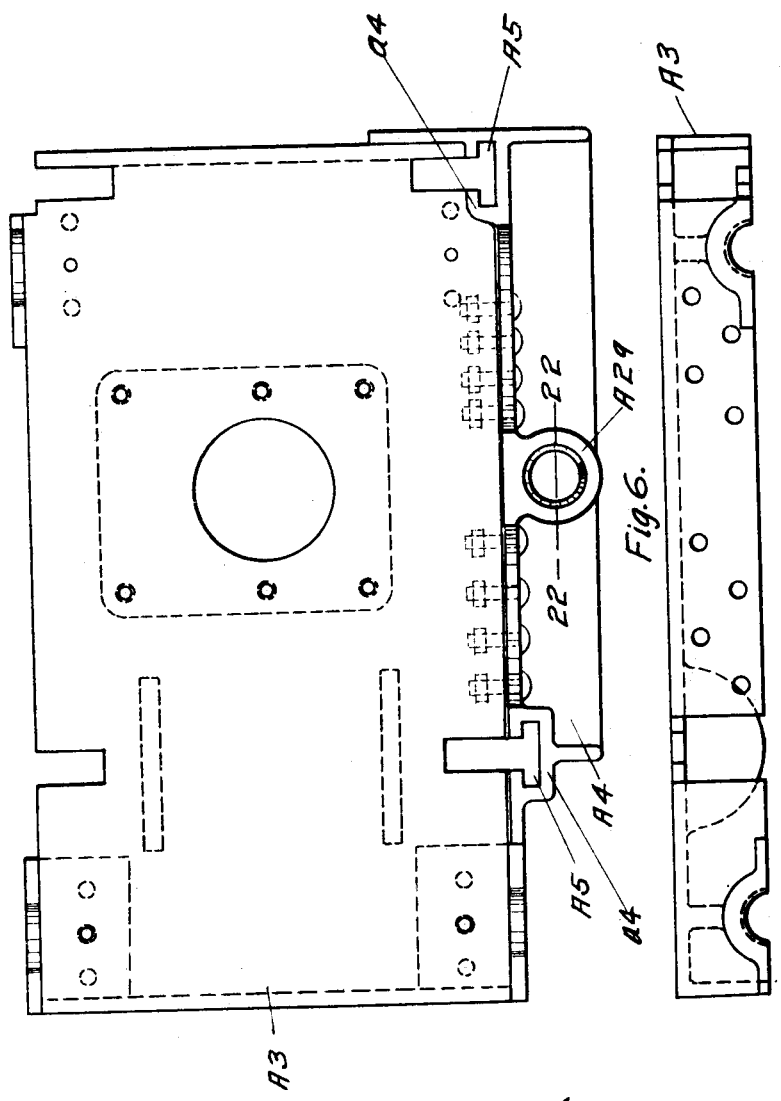
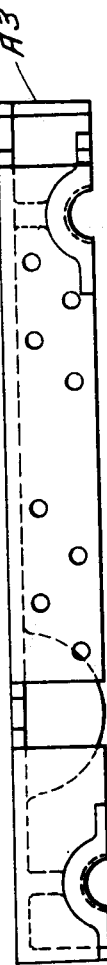
Inventor
Cyrus S. Oldroyd
By Cyrus Kehr
Attorney

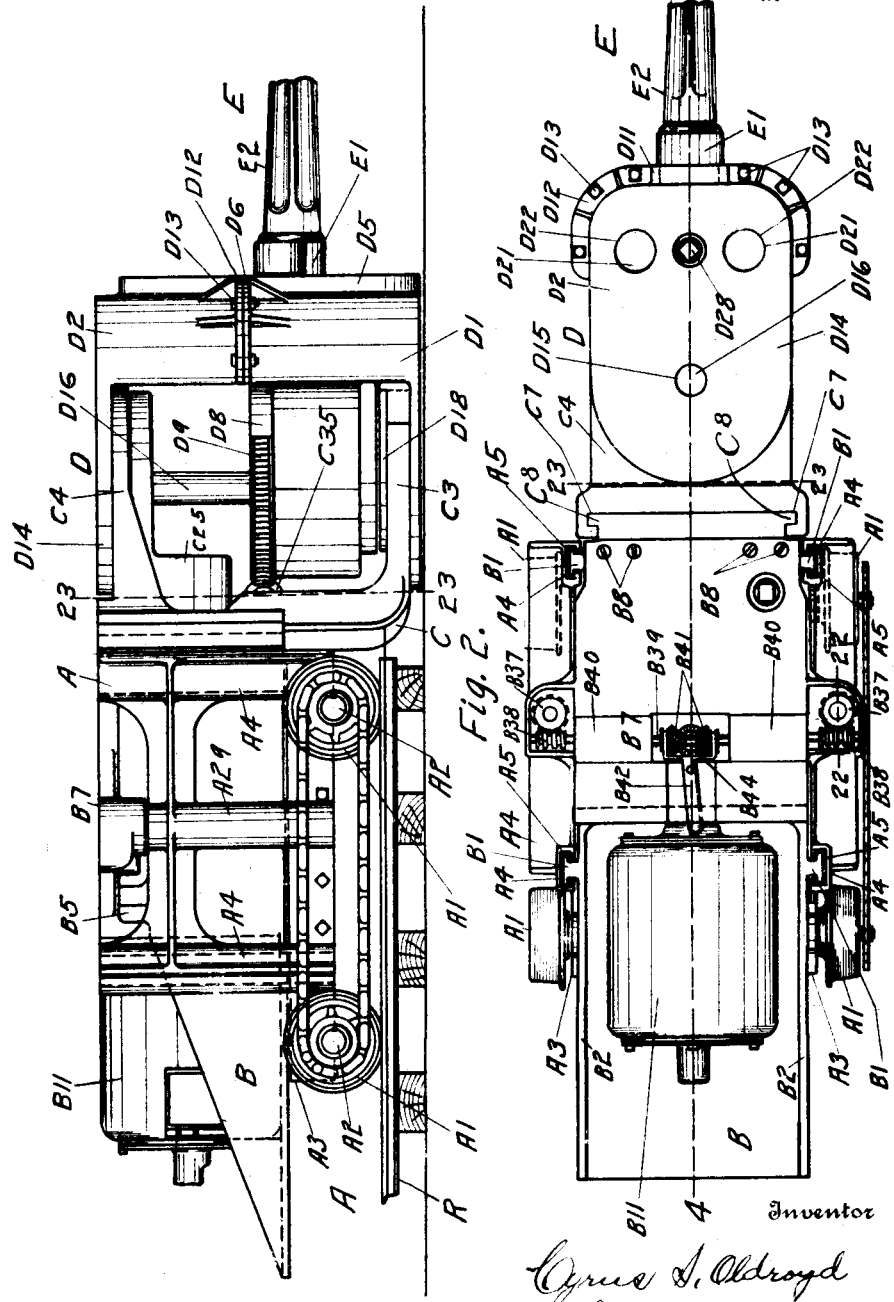

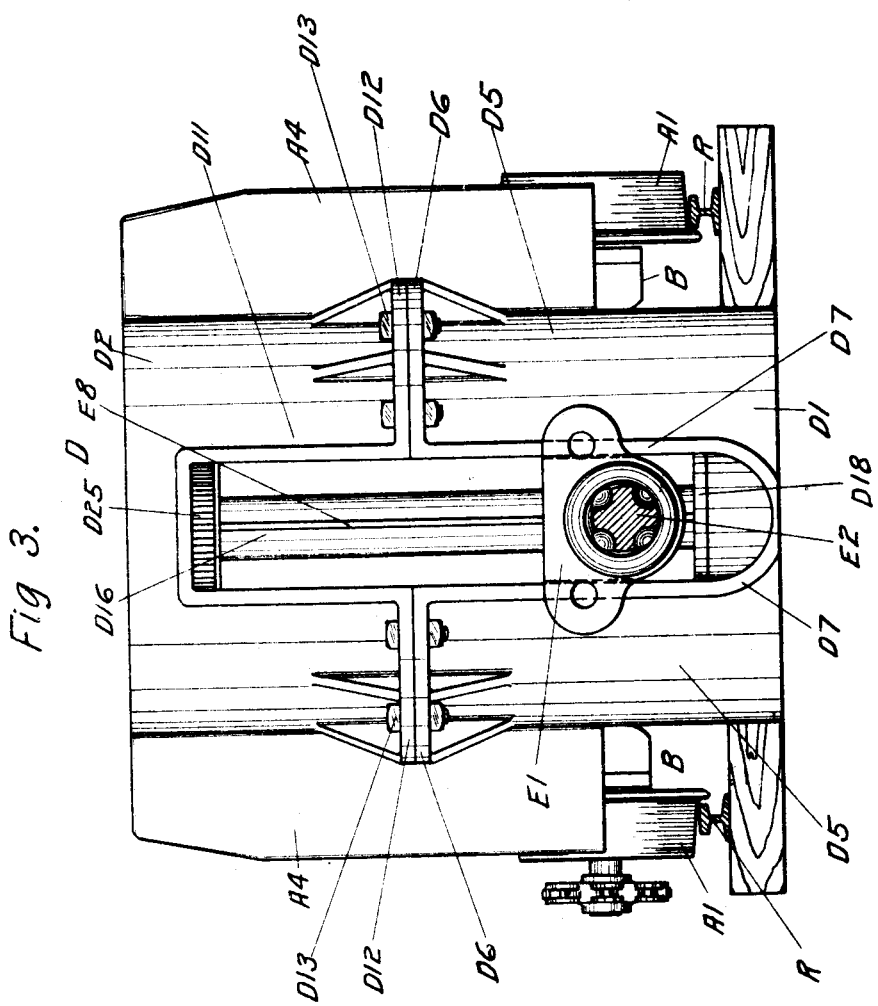

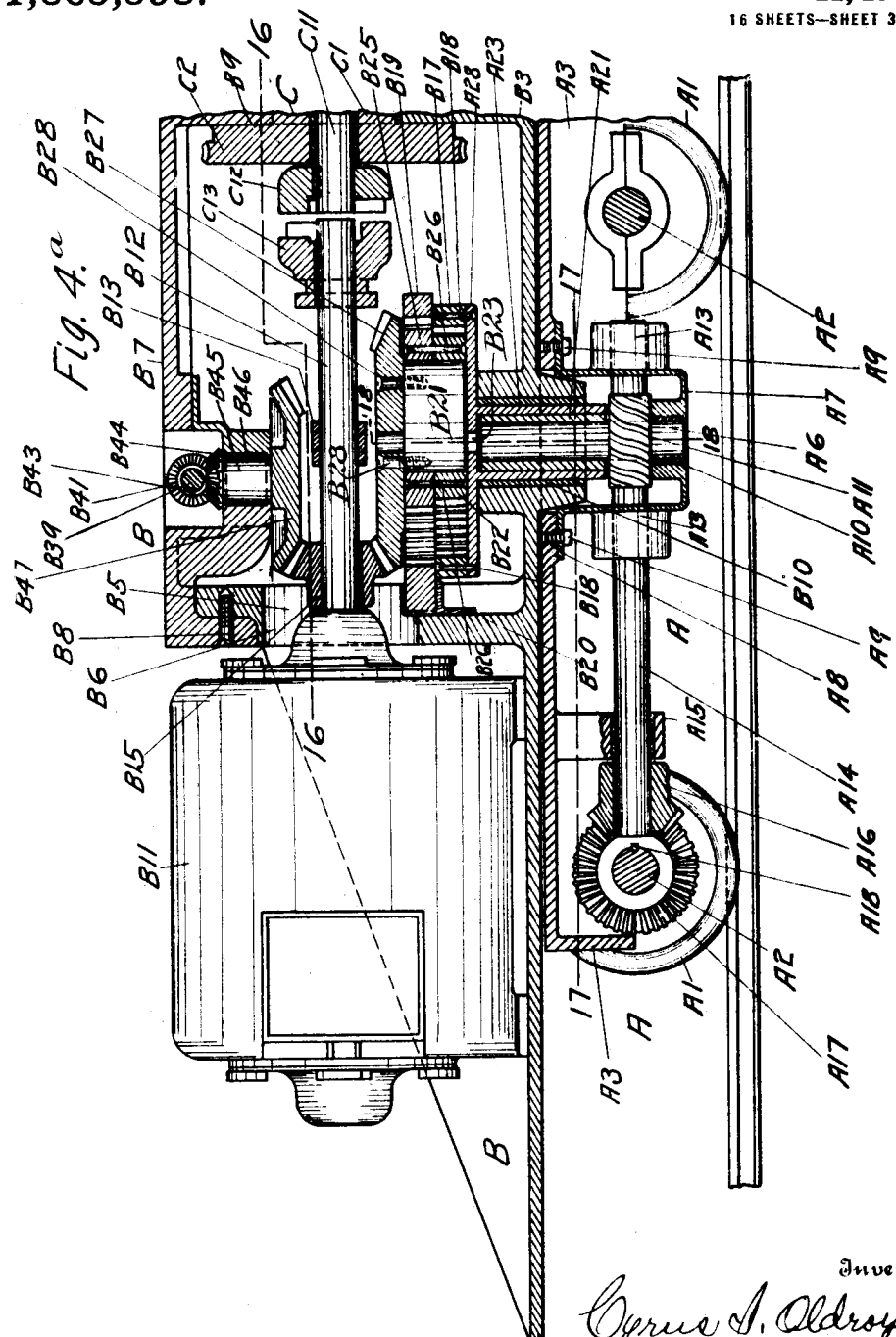

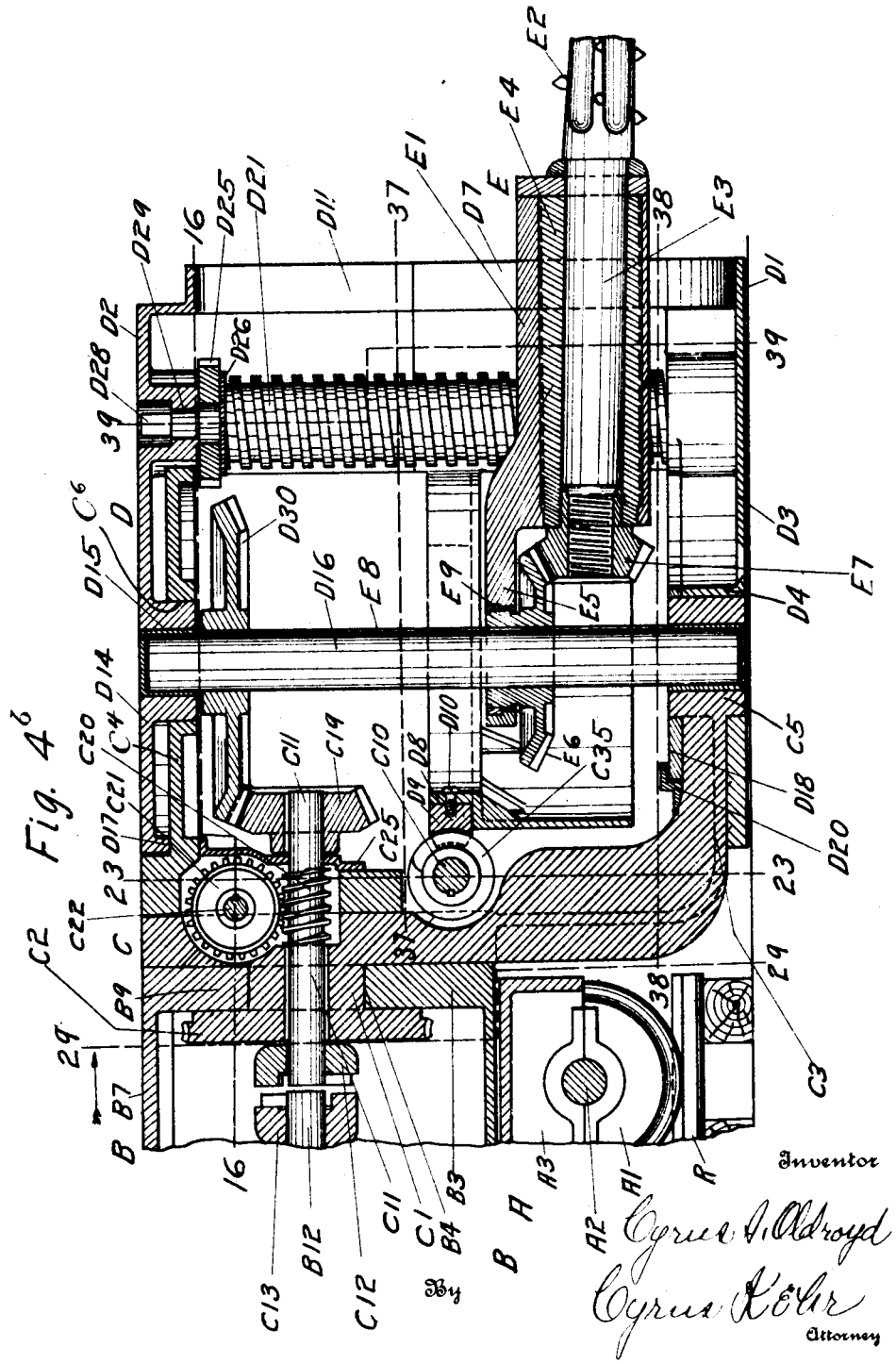

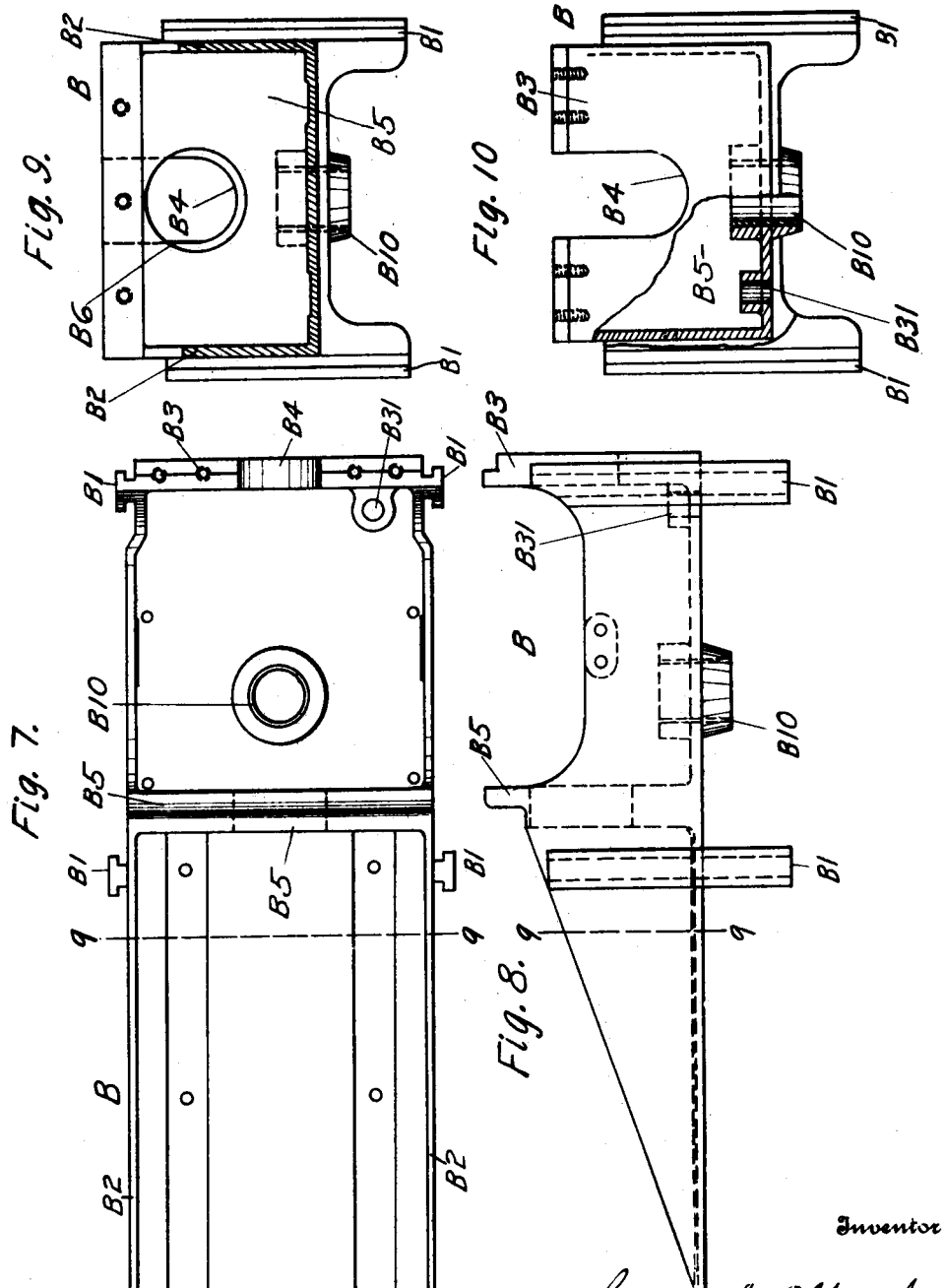

C. S. OLDROYD.
MINING MACHINE.
APPLICATION FILED MAY 5, 1916.

1,365,598.

Patented Jan. 11, 1921.
16 SHEETS—SHEET 7.

Inventor
Cyrus S. Oldroyd
By Cyrus K Ehr
Attorney

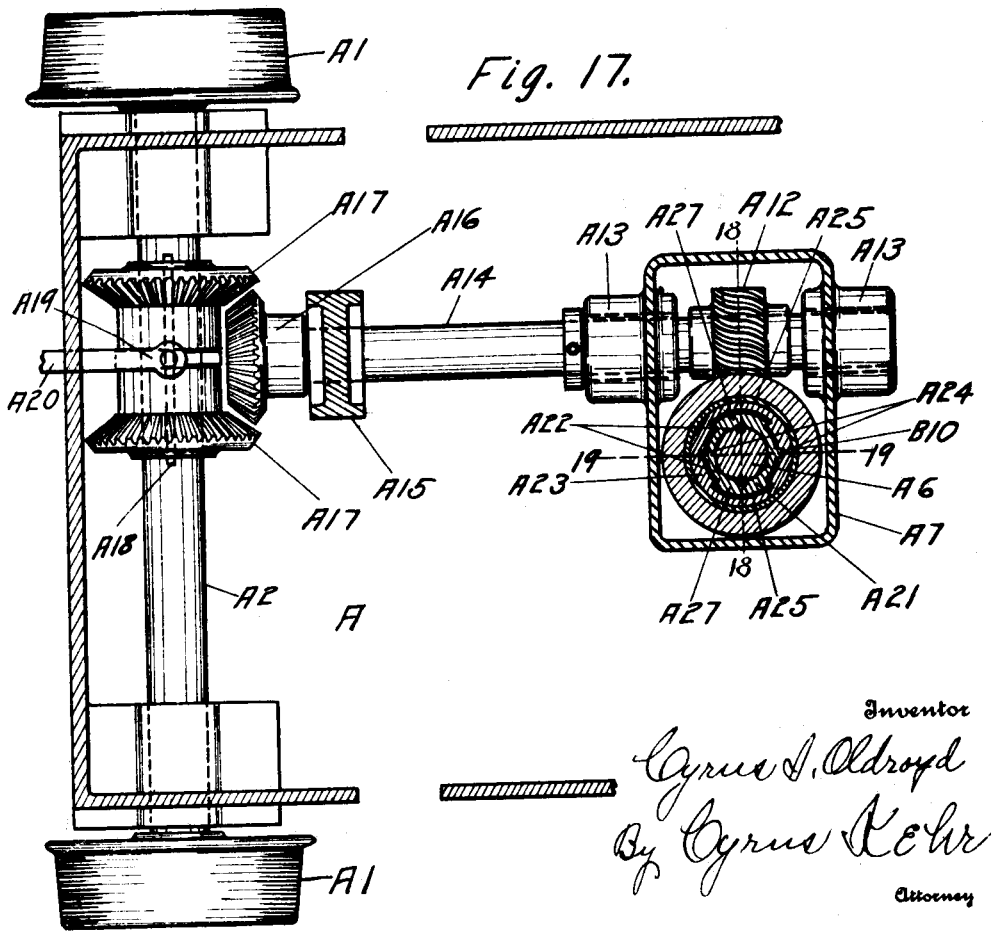

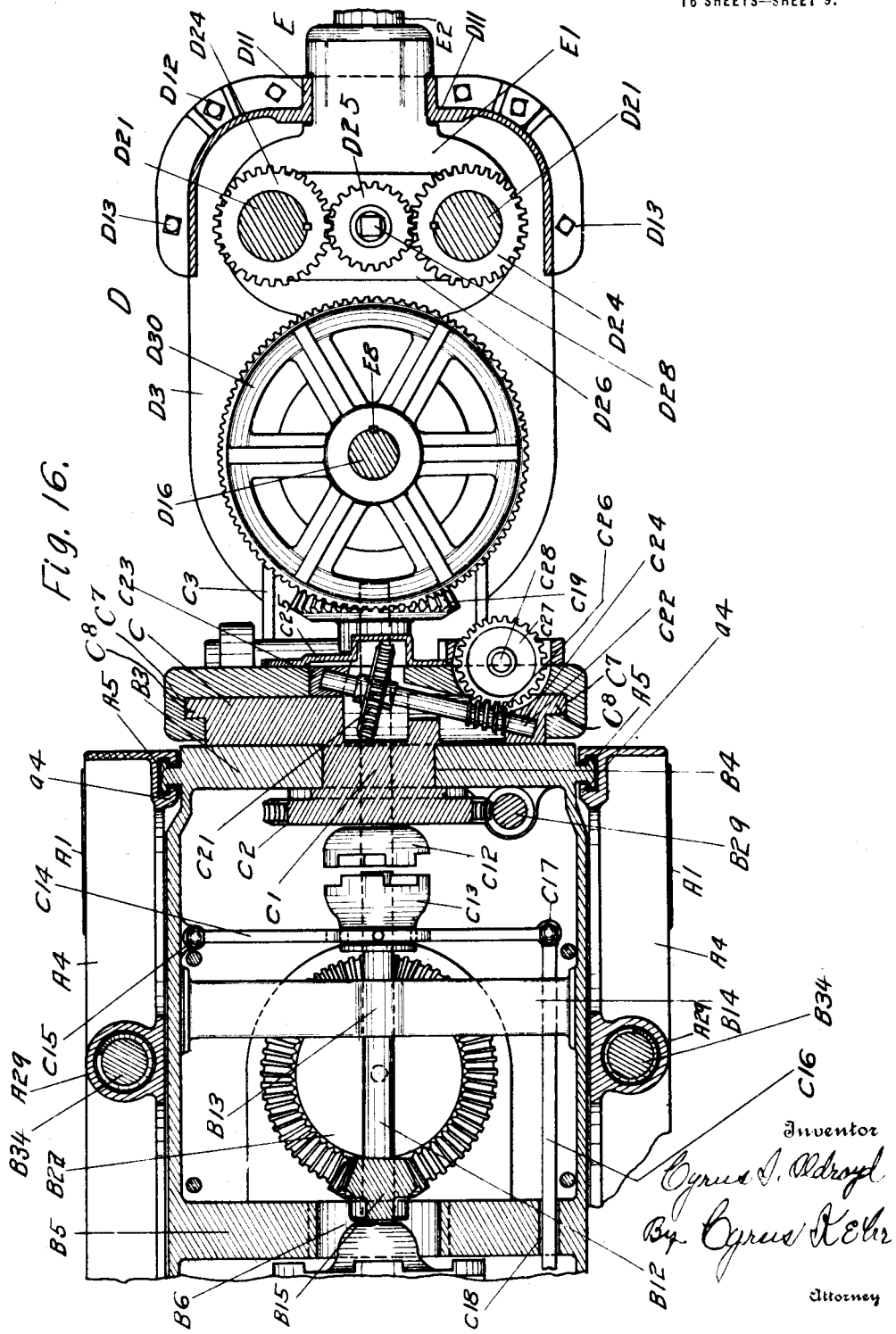

C. S. OLDROYD.
MINING MACHINE.
APPLICATION FILED MAY 5, 1916.
1,365,598.
Patented Jan. 11, 1921.
16 SHEETS—SHEET 10.
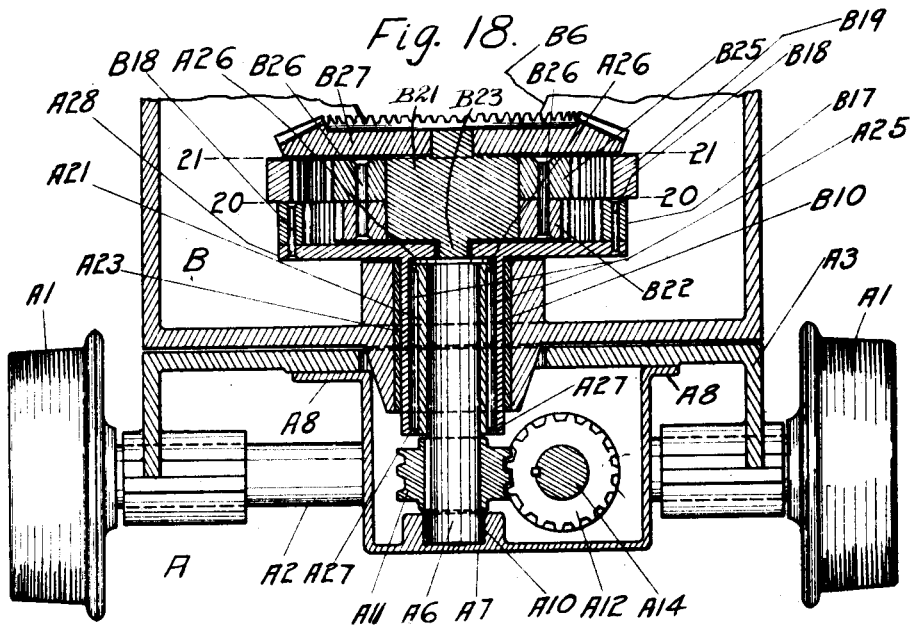
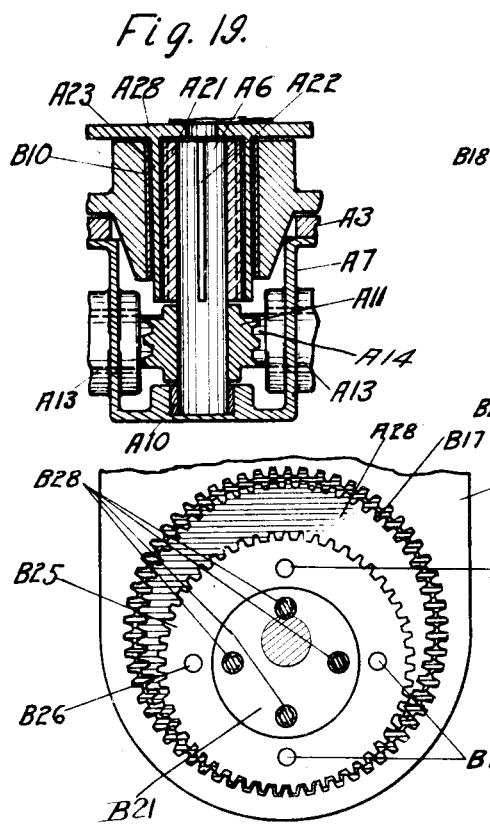
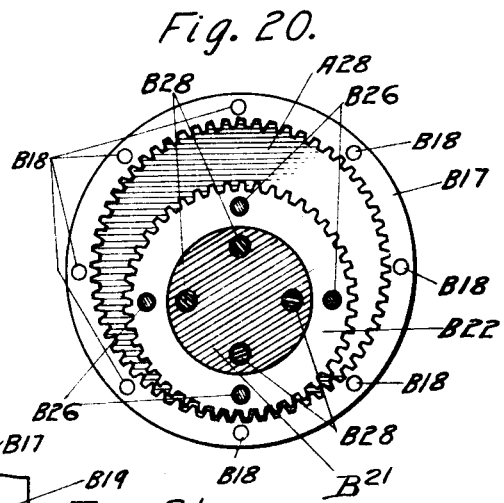
Inventor
Cyrus S. Oldroyd
By Cyrus Keller
Attorney C. S. OLDROYD.
MINING MACHINE.
APPLICATION FILED MAY 5, 1916.
1,365,598.
Patented Jan. 11, 1921.
16 SHEETS—SHEET 11.
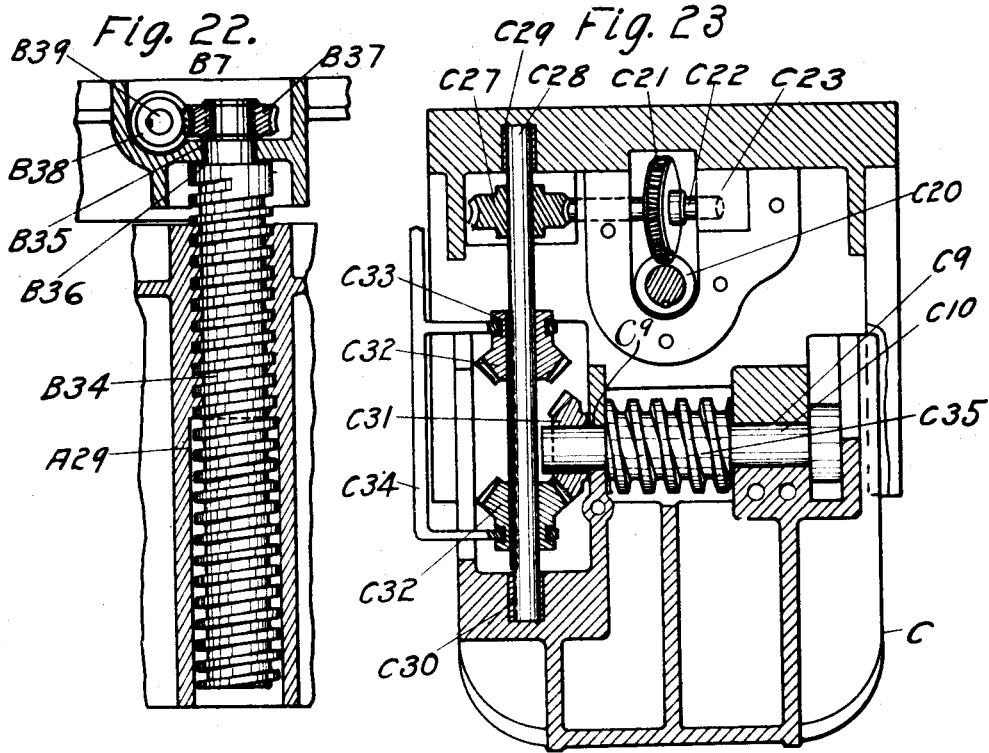
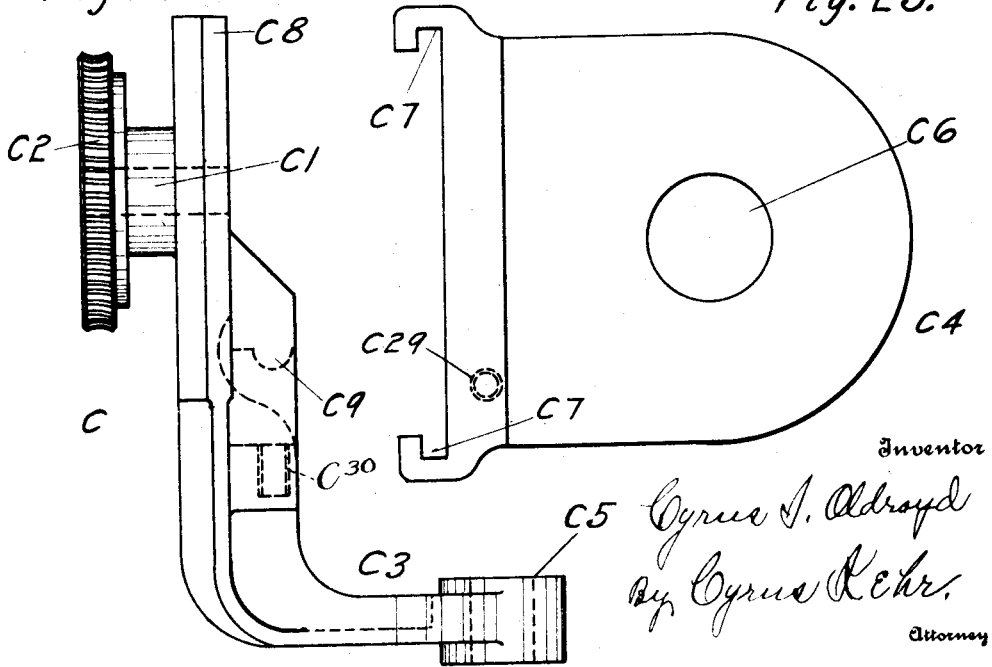

C. S. OLDROYD.
MINING MACHINE.
APPLICATION FILED MAY 5, 1916.

1,365,598.

Patented Jan. 11, 1921.
16 SHEETS—SHEET 12.

Inventor
Cyrus S. Oldroyd
By Cyrus Kehr
Attorney

C. S. OLDROYD.
MINING MACHINE.
APPLICATION FILED MAY 5, 1916.

1,365,598.

Patented Jan. 11, 1921.
16 SHEETS—SHEET 13.

Inventor
Cyrus S. Oldroyd
By Cyrus Kehr
Attorney

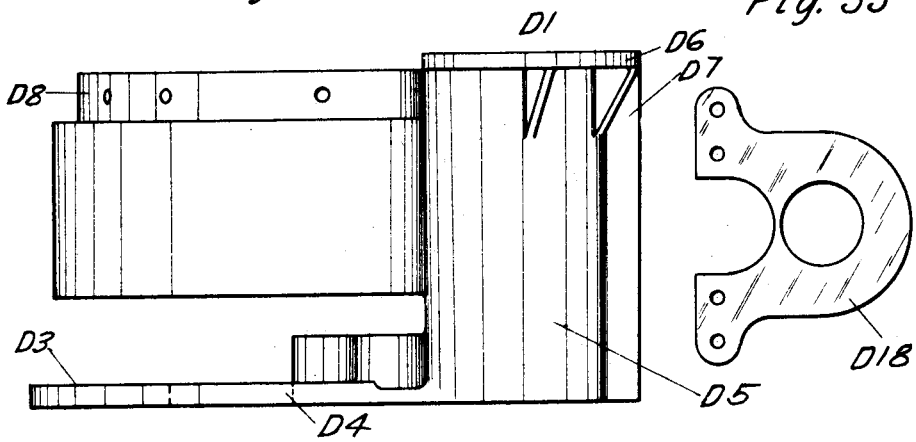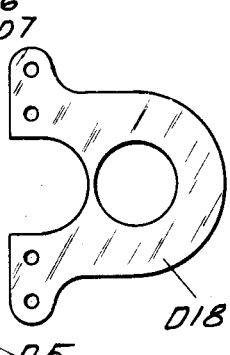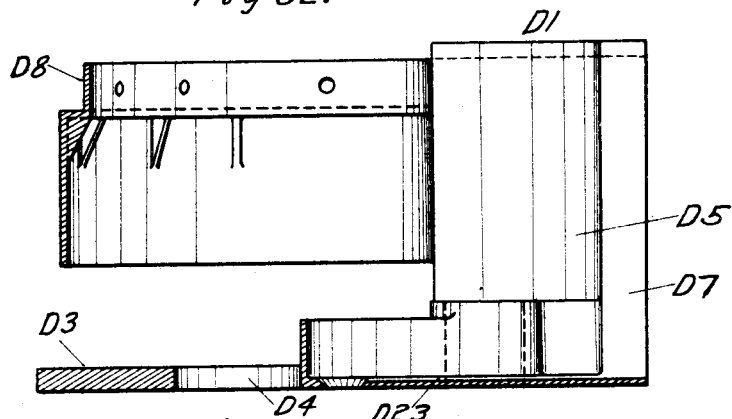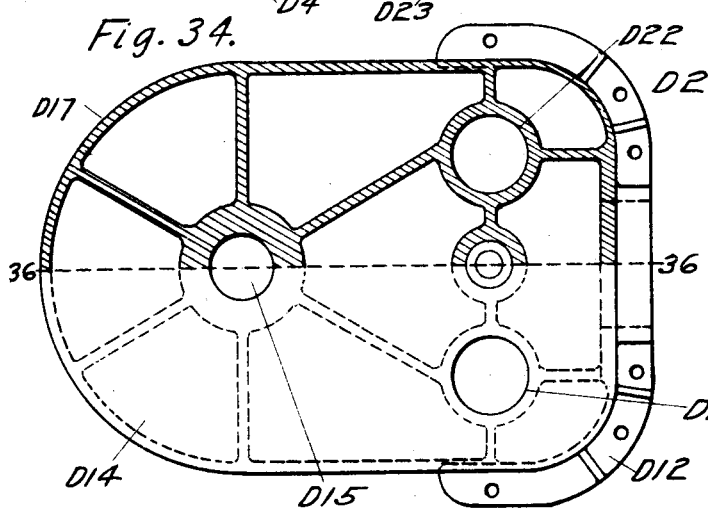

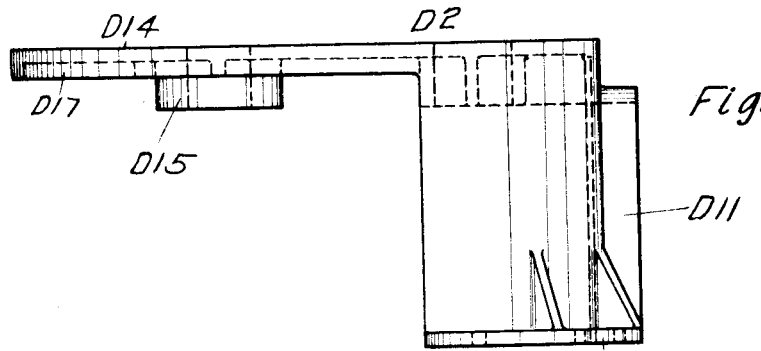
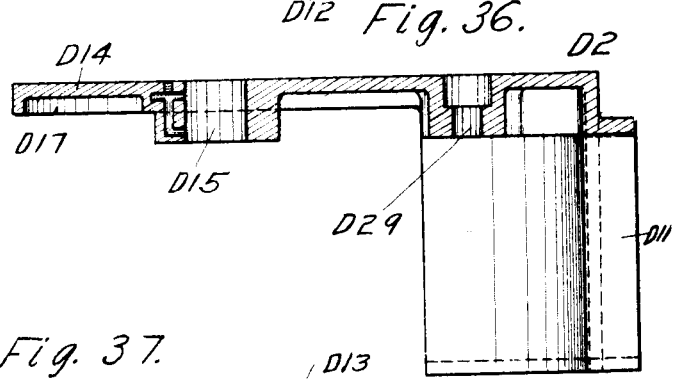
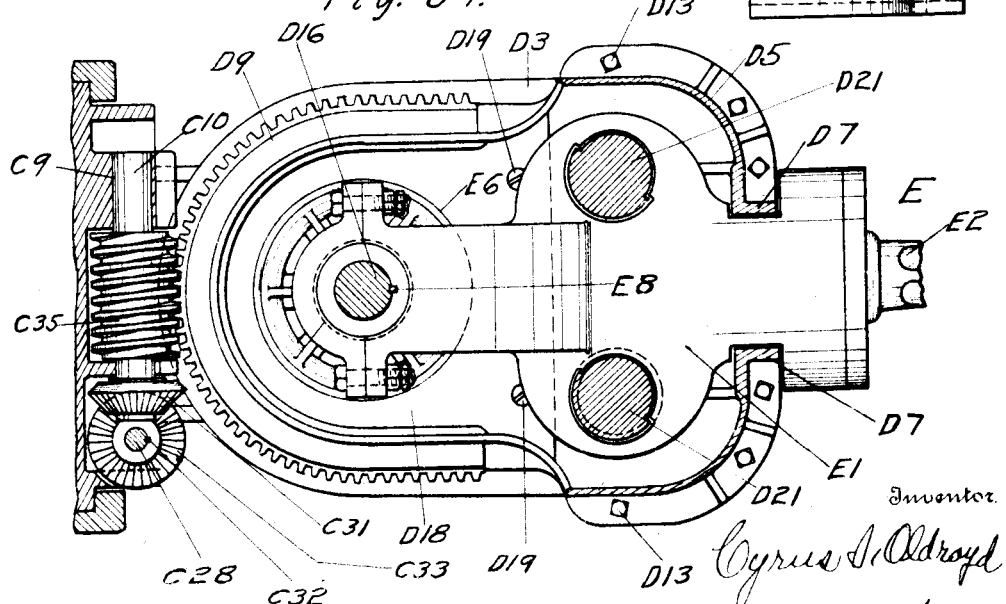

C. S. OLDROYD.
MINING MACHINE.
APPLICATION FILED MAY 5, 1916.

1,365,598.

Patented Jan. 11, 1921.
16 SHEETS—SHEET 16.

Inventor
Cyrus S. Oldroyd
By Cyrus Kehr
Attorney

UNITED STATES PATENT OFFICE.

CYRUS S. OLDROYD, OF KNOXVILLE, TENNESSEE.

MINING-MACHINE.

1,365,598.                Specification of Letters Patent.    Patented Jan. 11, 1921.

Application filed May 5, 1916. Serial No. 95,690.

*To all whom it may concern:*

Be it known that I, CYRUS S. OLDROYD, a citizen of the United States, residing at Knoxville, in the county of Knox and State of Tennessee, have invented a new and useful Improvement in Mining-Machines, of which the following is a specification, reference being had to the accompanying drawing.

My improvement relates particularly to machines used for cutting into upright walls of coal, rock, or similar material, the machine comprising cutting means actuated by the machine and projected endwise into the wall of coal, or other material, and then moved sidewise to make a sweeping cut.

The object of my improvement is to provide a machine by which the cutting means may be made to cut kerfs into the wall as follows: (1) horizontally along the floor level and horizontally at other levels as high as the machine can reach; (2) vertically and parallel to the general forward course of the machine within a certain range and diagonally to said course within a more extended range; (3) obliquely toward the right or toward the left within a certain range; (4) annularly around a horizontal axis which is parallel to the forward course of the machine; and (5) in a variety of curves.

Another object of the invention is to provide mechanism comprising cutting mechanism which may be lowered below and raised above the level of the track supporting the machine and operated for cutting in such low position, in order that the under-cutting may be at the level of the floor upon which the track rests.

By way of general statement, it may be said that the machine consists of (1) a truck having a rigid frame or body and having supporting or traction wheels adapted to rest on an ordinary rail track or on a floor; (2) a longitudinal body supported by the truck and movable up and down thereon; (3) a neck located at the front of said movable body and rotatable on a horizontal axis extending lengthwise of the machine and approximately in an upright plane cutting midway between the track rails; (4) a head supported upon the neck and rotatable thereon on an axis which is perpendicular to the axis upon which the neck rotates; (5) a tongue comprising a cutting mechanism support and cutting mechanism, said support being supported upon said head for movement toward and from the axis of rotation of said neck, whereby the cutting mechanism, supported by said support, is supported in substantially horizontal position and movable bodily toward and from the axis of rotation of the neck and for bodily orbital movement around said axis.

The truck, body, neck, head, and said support and the cutting means being thus related to each other, the cutting means may be put into a variety of positions and through a variety of movements while it is cutting, as will hereinafter be described.

In the accompanying drawings,

Figure 1 is an elevation of the right-hand side of a machine embodying my improvement;

Fig. 2 is a plan of the same machine;

Fig. 3 is a front elevation, the cutting tool being broken away;

Figure 11:
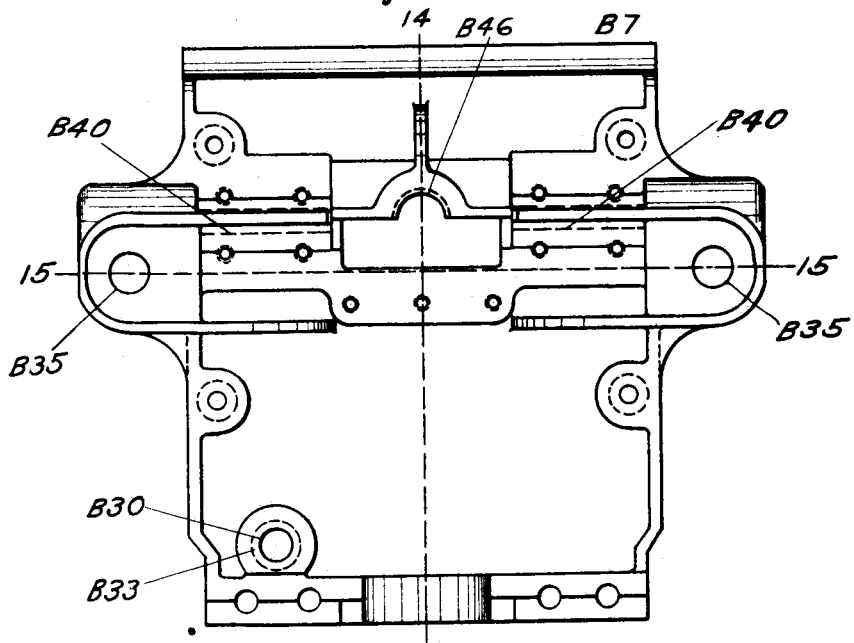
Figure 12:
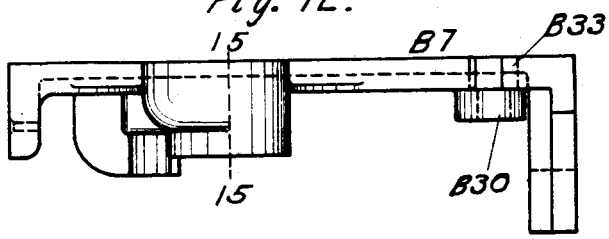
Figure 13:
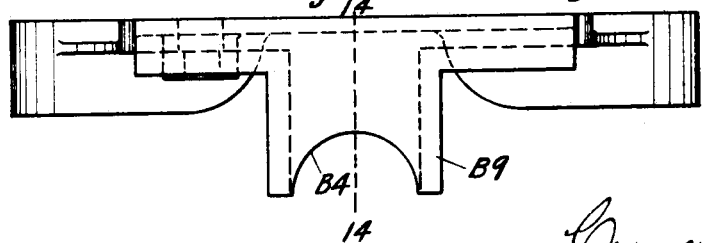
Figure 26:
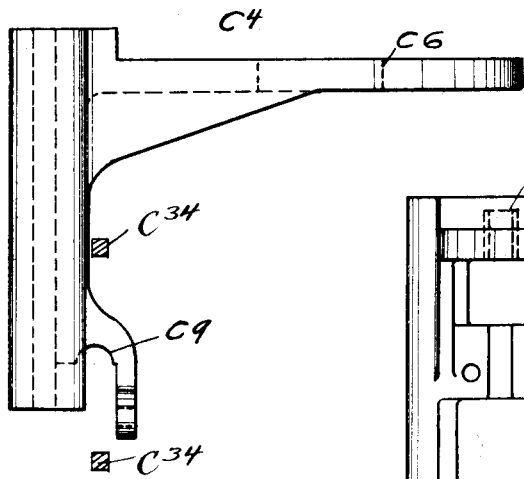
Figure 27:
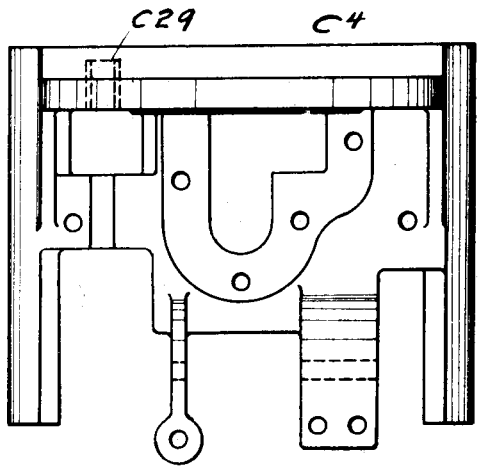
Figure 28:
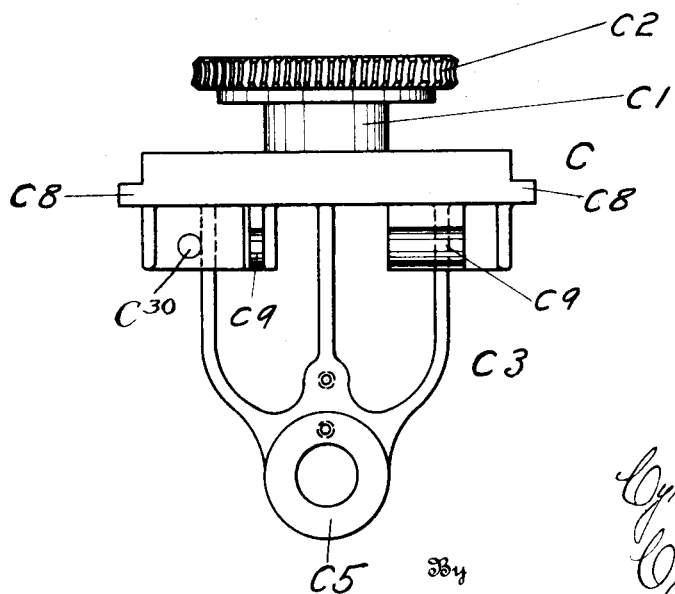
Figure 29:
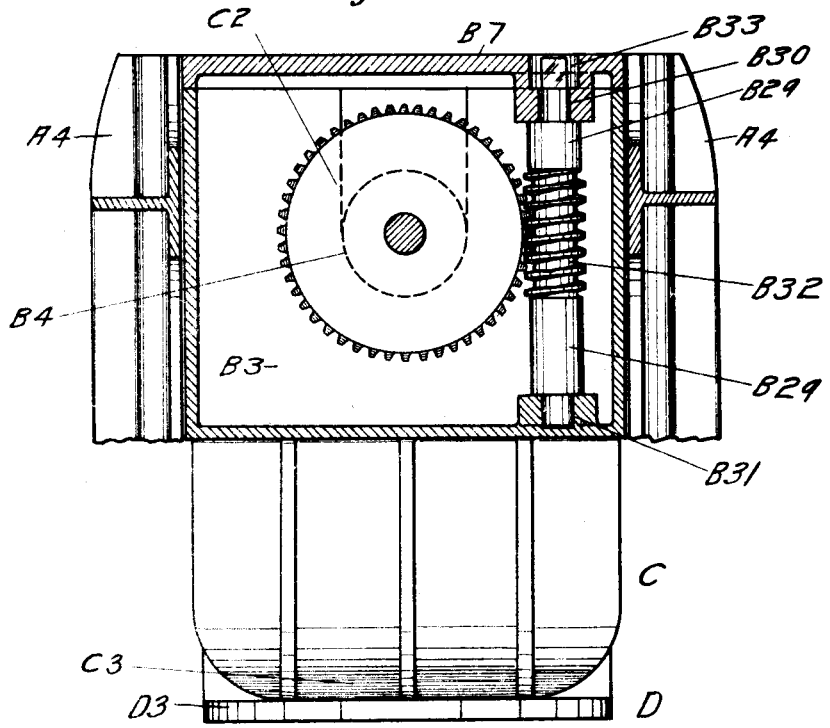
Figure 30:
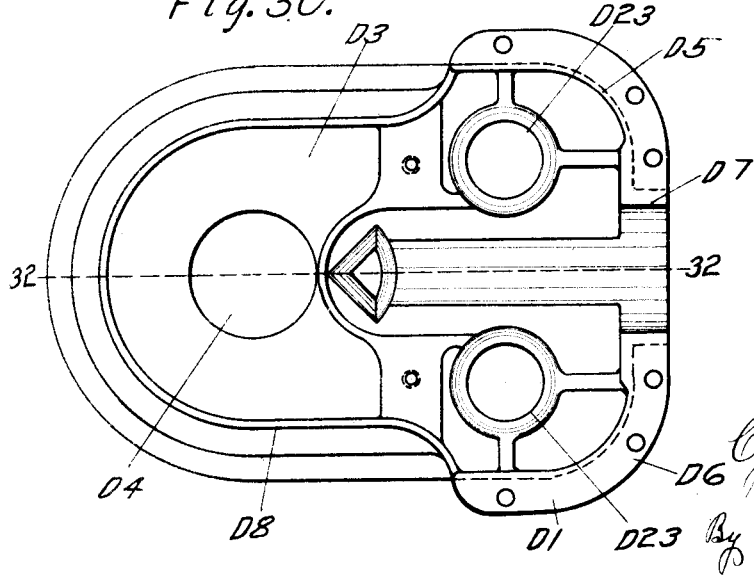
Figure 38:
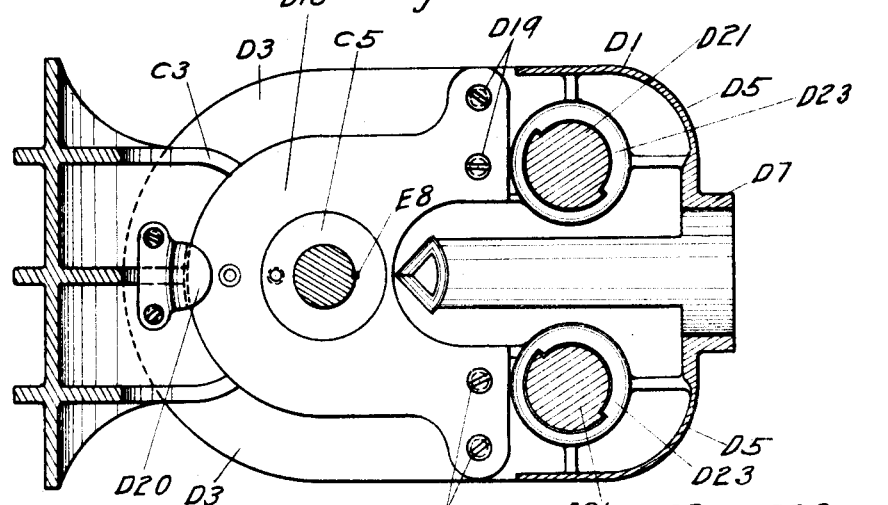
Figure 39:
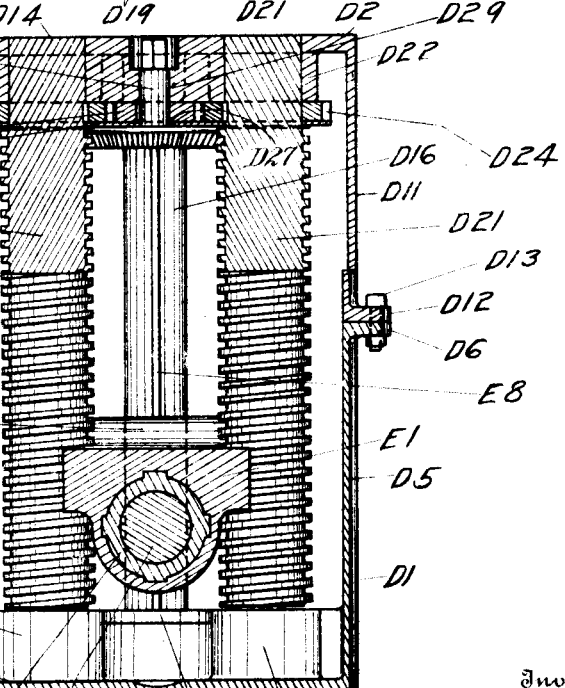

Figs. 4ª and 4ᵇ are an upright section on the line, 4—4, of Fig. 2, looking in the direction of the arrow, the section occupying two sheets, Fig. 4ᵇ being a continuation rightward of the structure shown in Fig. 4ª;

Fig. 5 is a plan of the truck platform, one of the upright side members being attached to the platform;

Fig. 6 is an elevation of the right-hand side of said platform;

Fig. 7 is a plan of the body of the machine separated from the truck and other parts;

Fig. 8 is an elevation of the right-hand side of said body;

Fig. 9 is an upright, transverse section on the line, 9—9, of Figs. 7 and 8, looking toward the right;

Fig. 10 is a front elevation of the body shown in Figs. 7 and 8, portions being broken away;

Fig. 11 is a bottom view of the top plate of the body of the machine;

Fig. 12 is an elevation of the right-hand edge of said plate;

Fig. 13 is an elevation of the front end of said plate;

Fig. 14 is a longitudinal upright section on the line, 14—14, of Figs. 11 and 13;

Fig. 15 is an upright transverse section on the line, 15—15, of Figs. 11, 12 and 14;

Fig. 16 is a horizontal section on the line, 16—16, of Figs. 4ª and 4ᵇ looking downward;

Fig. 17 is a horizontal section on the line, 17—17, of Fig. 4ª;

Fig. 18 is an upright, transverse section on the line, 18—18, of Fig. 4ª;

Fig. 19 is an upright section on the line, 19—19, of Fig. 17;

Fig. 20 is a horizontal section on the line, 20—20, of Fig. 18, looking downward;

Fig. 21 is a horizontal section on the line, 21—21, of Fig. 18, looking downward;

Fig. 22 is an upright, longitudinal, detail section on the line, 22—22, of Figs. 2 and 5, showing a screw and worm gear mechanism for raising the body of the machine on the truck;

Fig. 23 is a section on the line, 23—23, of Figs. 1, 2 and 4ᵇ, looking toward the left;

Fig. 24 is a side elevation of the neck, the detachable upper forward extension thereof being omitted;

Fig. 25 is a plan of said extension;

Fig. 26 is a side elevation of said extension;

Fig. 27 is a front elevation of said extension;

Fig. 28 is a plan of the neck shown in Fig. 24;

Fig. 29 is an upright transverse section on the line, 29—29, of Fig. 4ᵇ, looking toward the right;

Fig. 30 is a plan of the lower head section;

Fig. 31 is a right-hand side elevation of said section;

Fig. 32 is an upright longitudinal section on the line, 32—32, of Fig. 30;

Fig. 33 is a plan of a binding plate to be applied to the lower head section;

Fig. 34 is a top view of the upright head section, portions being broken away;

Fig. 35 is a right-hand side elevation of said upper head section;

Fig. 36 is an upright longitudinal section on the line, 36—36, of Fig. 34;

Fig. 37 is a horizontal section on the line, 37—37, of Fig. 4ª;

Fig. 38 is a horizontal section on the line, 38—38, of Fig. 4 (right-hand portion);

Fig. 39 is a section on the line, 39—39, of Fig. 4ª, looking toward the left, portions being broken away.

Referring to said drawings, A designates the truck. B designates the longitudinal body which is movable up and down on the truck. C designates the neck which is supported on the forward end of said body and rotatable on an axis which is horizontal and parallel to the body, B, and the track rails, R. D designates the head which is supported by said neck and rotatable thereon through approximately 180 degrees on an axis which is perpendicular to the axis of the neck. E designates the tongue.

The truck comprises supporting or traction wheels $A^1$, which are in the form of ordinary mine car wheels and mounted on axles $A^2$. $A^3$ is a horizontal platform supported upon said axles and upon which is supported the body, B. The platform is shown in the form of a rectangle with downward-directed flanges along its four edges. To each side flange of the platform is bolted the lower portion of an upright cast metal side member, $A^4$, comprising two guide standards, $a^4$, and an upright tube or barrel, $A^{29}$. Each of said guide standards is provided with an upright channel, $A^5$, directed toward the corresponding standard at the opposite side of the truck platform. The body, B, rests between said side members and has upright tongues, $B^1$, extending into the channels, $A^5$, of said guide standards so as to permit up and down movement of said tongues in said channels. Said channels and said tongues are shown T-shape in cross-section, in order that said tongues and standards may engage each other to resist relative lateral movement. The tongues, $B^1$, are supported upon upright side walls, $B^2$, of the body and extend downward below the bottom of the body, B, as shown in Figs. 8, 9 and 10.

At the forward end of the body is a front cross wall, $B^3$. At its middle the upper portion of said wall is cut out to form the lower half of a bearing, $B^4$.

Approximately midway between its front and rear ends, the body has a rear cross wall, $B^5$, which has a circular opening, $B^6$, in horizontal axial alinement with the bearing, $B^4$, in the cross wall, $B^3$.

A top plate, $B^7$, rests upon the cross walls, $B^3$ and $B^5$. Said top plate is secured in position by bolts, $B^8$, extending downward through said plate into the cross walls and also into the bottom of the body, B, and also horizontally through the rear flange of the top plate into the upper portion of the rear cross wall, $B^5$.

At the middle of the forward edge of the top plate is a downward extension, $B^9$, fitting into the opening in the front cross wall, $B^3$, and having in its lower end a half circular recess which forms the upper half of the bearing, $B^4$, already described.

In the bottom of the body, B, a little way forward of the rear cross wall, $B^5$, and on the middle of the upright plane of said body is an upright bearing, $B^{10}$ (see Figs. 4ª, 4ᵇ, 7, 8, 9, and 10) in which rests an upright shaft, $A^6$. Below said bearing is an upright housing, $A^7$, having an upper annular horizontal flange, $A^8$, secured against the lower face of the platform by means of bolts or screws, $A^9$. In the bottom of said housing is a bearing, $A^{10}$, which receives the lower end of the shaft, $A^6$. On said shaft, just above said bearing is a worm gear wheel, $A^{11}$, which meshes with a worm gear wheel, $A^{12}$, on a shaft, $A^{14}$, resting in bearings, $A^{13}$, formed in the housing, $A^7$. Said shaft, $A^{14}$, rests also in a bearing, $A^{15}$, extending downward from the truck platform. (Figs. 4, 17 and 18.) On the rear end of said shaft is a bevel gear wheel, $A^{16}$.

Adjacent the gear wheel, $A^{16}$, on the rear axle, $A^2$, are supported two bevel gear wheels, $A^{17}$, facing toward each other and slidable lengthwise on the shaft and held against rotation on the shaft by a feather, $A^{18}$. Each of said gear wheels has a grooved hub engaged by an arm, $A^{19}$, on a shift lever, $A^{20}$. By means of said lever and said lever arms, said wheels, $A^{17}$, are spaced from each other so that either of said wheels may be brought into mesh with the gear wheel, $A^{16}$, or both moved out of engagement with the wheel, $A^{16}$. By means of the shaft, $A^6$, and $A^{14}$, and the axle, $A^2$, and the gear wheels associated therewith, the axle, $A^2$, may be rotated in either direction, at the will of the operator, for propelling the truck forward or backward. Power is transmitted to the shaft, $A^6$, as will be hereinafter described.

At the rear of the rear cross wall, $B^5$, a motor, $B^{11}$, is seated upon the floor of the body, B, and has a horizontal rotary axle, $B^{12}$, in axial alinement with the bearing, $B^4$, in the front cross wall, $B^3$; but said axle ends before reaching said cross wall. Said axle has a bearing, $B^{13}$, on a horizontal, transverse bridge, $B^{14}$, supported by said side walls of the body, B. Near the motor and at the forward side of the rear cross wall, $B^5$, is a bevel gear wheel, $B^{15}$, surrounding the axle, $B^{12}$, and immovably keyed thereto.

Surrounding the shaft, $A^6$, is a sleeve, $A^{21}$, slidable up and down on said shaft, but held against rotation on said shaft by means of feathers, $A^{22}$, extending into corresponding grooves in said sleeve. Surrounding the sleeve, $A^{21}$, is another sleeve, $A^{23}$, which is slidable up and down on the sleeve, $A^{21}$, but held against rotation thereon by means of feathers, $A^{24}$, formed near the sleeve, $A^{21}$, and extending into corresponding grooves on the sleeve, $A^{23}$. At opposite sides, the sleeve, $A^{23}$, has upright interior channels, $A^{25}$. At the upper end of the sleeve, $A^{21}$, a fixed stud, $A^{26}$, extends from the sleeve, $A^{21}$, into one of the channels, $A^{25}$; and at the lower end of the sleeve, $A^{23}$, a stud extends from said sleeve into the channel, $A^{25}$. When the sleeve, $A^{23}$, is lifted, the lower studs, $A^{27}$, are carried upward against the upper studs, $A^{26}$, so that when there is further movement of the sleeve, $A^{23}$, the sleeve, $A^{21}$, is engaged and carried upward simultaneously with the sleeve, $A^{23}$. The upper end of the sleeve, $A^{23}$, is joined immovably to a circular plate or disk, $A^{28}$. When said disk is rotated, said sleeves and the shaft, $A^6$, are correspondingly rotated, regardless of the elevation of the disk, $A^{28}$. The purpose of said sleeves is to maintain gear connection between the motor axle, $B^{12}$, and the truck shaft, $A^{14}$, regardless of the elevation of the body, B. The sleeve, $A^{23}$, rests rotatably in a bearing, $B^{10}$, and the plate or disk, $A^{28}$, rests upon and is supported by the upper end of said bearing.

An annular internal gear wheel, $B^{17}$, lies flatwise upon the plate, $A^{28}$, and is concentric with shaft, $A^6$, and is secured to the plate, $A^{28}$, by means of rivets, $B^{18}$. Immediately above the gear, $B^{17}$, and on the same axis is another annular internal gear, $B^{19}$, which is a little larger than the gear, $B^{17}$, and which is held against rotation by brackets, $B^{20}$, supported by the side walls of the body, B.

Within the internal gears, $B^{17}$ and $B^{19}$, and resting upon the plate, $A^{28}$, is an eccentric wheel, $B^{21}$, extending to the upper level of the gear $B^{19}$. A stud, $B^{23}$, extends downward from the eccentric wheel, $B^{21}$, into a bearing, $B^{24}$, on the axis of the shaft, $A^6$. An eccentric gear, $B^{22}$, loosely surrounds the eccentric wheel, $B^{21}$, and meshes with the internal gear, $B^{17}$. Also loosely surrounding the eccentric wheel, and resting upon the eccentric gear, $B^{22}$, is a similar eccentric gear, $B^{25}$. The gear, $B^{25}$, is secured to the lower gear wheel, $B^{22}$, by means of rivets, $B^{26}$, and it is a little larger in diameter than the eccentric gear, $B^{22}$, so as to permit meshing with the upper internal gear, $B^{19}$. Upon the upper face of the eccentric wheel, $B^{21}$, is a bevel gear, $B^{27}$, meshing with the bevel pinion, $B^{15}$, already described as surrounding the motor axle, $B^{12}$, adjacent the rear cross wall, $B^5$. The bevel gear wheel, $B^{27}$, is secured to the upper cam wheel, $B^{25}$, by means of screw bolts, $B^{28}$. The gearing thus described is already known to the art as an "epicyclic gearing." In the present structure it is employed for transmitting motion from the motor axle to the upright shaft, $A^6$, at a reduced velocity.

It is to be observed that this gearing is to be used only when it is desired to move the machine bodily forward or backward on the track. When it is desired that the machine shall remain stationary while the motor is in action, the shift lever, $A^{20}$, is so set as to bring both bevel gear wheels, $A^{17}$, out of engagement with the bevel gear wheels, $A^{16}$, on the truck shaft, $A^{14}$.

On each side wall of the truck is a fixed upright barrel, $A^{29}$, which is interiorly screw threaded to receive a screw shaft, $B^{34}$. The top plate has a bearing, $B^{35}$, through which the upper end of said shaft extends. Below said bearing, said shaft has an annular shoulder, $B^{36}$, abutting against said bearing. The upper end of said shaft is surrounded by a worm gear wheel, $B^{37}$, which meshes with a worm, $B^{38}$, on a transverse horizontal shaft, $B^{39}$, resting in bearings, $B^{40}$. The rotation of said shaft rotates the worm gear wheels, $B^{37}$, and the screw shafts, $B^{34}$, whereby the latter moves up or down, according to the direction of such rotation. As they are moved upward they lift the top plate, $B^7$, of the body, B, and since said plate is bolted to the remainder of the body, the body and all the parts supported thereby—the neck, head, and tongue, are lifted.

On the shaft, $B^{39}$, are two bevel gear wheels, $B^{41}$, directed toward each other and engaged by a shift lever, $B^{42}$, which engages the hubs of said gear wheels in such manner as to permit their rotation. Both of said gears are slidable endwise upon said shaft; but a feather, $B^{43}$, on said shaft compels the rotation of said gears with said shaft. Below said shaft and between said bevel gear wheels, is another bevel gear wheel, $B^{44}$, mounted on an upright shaft, $B^{45}$, resting in a bearing, $B^{46}$, formed on the top plate, $B^7$. On the lower end of said shaft, $B^{45}$, is a bevel gear wheel, $B^{47}$, which meshes with the bevel gear wheel, $B^{15}$, already described as being fixed on the motor axle, $B^{12}$. The bevel gear wheels, $B^{41}$, are spaced from each other far enough to permit placing both out of engagement with the bevel gear wheel, $B^{44}$. By moving the shift lever horizontally, either of the wheels, $B^{41}$, may be put into engagement with the wheel, $B^{44}$. When one of the wheels, $B^{41}$, is in engagement with the wheel, $B^{44}$, the screw shafts, $B^{34}$, are moved upward and the body of the machine is then lifted, and when the other of said wheels, $B^{41}$, is put into engagement with the wheel, $B^{44}$, said screw shafts and the body of the machine are lowered. When both of the wheels, $B^{41}$, are out of engagement with the wheel, $B^{44}$, the worms, $B^{38}$, on the shaft, $B^{39}$, lock the screw shafts against rotation, so that the body must remain at the elevation at which it, at the time, stands.

The chief purpose in thus raising and lowering the body, B, is to provide for bringing portions of the head, and neck, and tool support below the level of the supporting faces of the machine (the lower faces of the wheels, $A^1$) and to the lower level of the track which supports the truck during the cutting operation, in order that the cutting tool may cut at the level of the floor upon which the track rests.

In describing the neck and the head, for convenience, it will be assumed that the neck has been so turned on its axis as to bring these parts into the position shown in Figs. 1, 3, and 4 of the drawings, so that the portion of the neck which extends the farther from the longitudinal axis of the machine (the axial line of the motor, $B^{11}$, and the motor axle $B^{12}$) is directed to or toward the floor, such portion being, for convenience, designated the lower portion of the neck, while the portion which is then above said longitudinal axial line is designated the upper portion of the neck.

The neck, C, comprises a rigid horizontal journal, $C^1$, preferably integral with the other portions of said neck, which journal rests in the bearing, $B^4$, which, as above described is formed in the forward cross wall, $B^3$, and the downward extension, $B^9$, of the top-plate. On the rear end of said journal is a worm gear wheel, $C^2$, which bears against the rear face of the transverse wall, $B^3$. Above the level of the axis of the journal, $C^1$, the neck extends only to the height of the top-plate, $B^7$. Below said axis, the neck (when the body is in its lower position) extends downward below the level of the track rails, R, and close to the portion of the floor which is in front of said rails, the neck thus extending below the supporting faces of the machine or the upper surface of the track rails as much as the sum of the height of the track rails plus the ties, T, upon which the rails are supported.

The neck, C, has a lower forward extension, $C^3$, and an upper forward extension, $C^4$ secured thereto. On a common axial line which is perpendicular to the axis of the neck, the extension, $C^3$, has a bearing, $C^5$, and the extension, $C^4$, has a bearing, $C^6$. The extension, $C^4$, is detachable from the upright portion of the head. On each lateral edge, said extension has an upright groove, $C^7$, each being directed toward the other and receiving corresponding upright tongues, $C^8$, fixed on the neck. The extension, $C^4$, is put into position by placing it above the main portion of the neck, (when the extension, $C^3$, is in the lower position) and then moving said extension downward, the grooves, $C^7$, receiving the tongues, $C^8$.

At approximately the height of the bottom of the body, A, is a bearing, $C^9$, which is horizontal and transverse to the length of the machine and receives a shaft, $C^{10}$. The lower half of said bearing is formed on the front face of the main portion of said neck while the upper half of said bearing is formed on the detachable forward extension, $C^4$, of the neck. When, during the descent of said extension, the upper half of said bearing meets the lower half, the descent of said extension is arrested. In other words, the lower half of said bearing forms a stop for determining the rest position of said forward extension. In axial alinement with the axle, $B^{12}$, of the motor is a shaft, $C^{11}$, extending through and rotatable in the journal, $C^1$, of the neck, C. On the rear end of the shaft, $C^{11}$, is a tooth-clutch member, $C^{12}$, secured immovably to said shaft and directed toward a companion clutch member, $C^{13}$, feathered on the adjacent end of the motor axle, $B^{12}$, and adapted to engage the clutch member, $C^{12}$. The clutch member, $C^{13}$, is controlled by a clutch bar, $C^{14}$, hinged at $C^{15}$ to the side wall of the body B, and coupled to said clutch member, and a shift lever, $C^{16}$, which is hinged to the clutch bar at $C^{17}$ and has a slide bearing, $C^{18}$, in the rear cross wall, $B^5$. By shifting said shift lever endwise, said clutch members are moved into and out of engagement with each other. When they are in engagement with each other, the shaft, $C^{11}$, is rotated in unison and in the same direction with the motor axle, $B^{12}$. On the forward end of the shaft, $C^{11}$, is a bevel gear wheel, $C^{19}$, meshing with the bevel gear wheel, $D^{30}$, described farther on.

On the shaft, $C^{11}$, is a worm gear, $C^{20}$, meshing with a worm gear wheel, $C^{21}$, on a shaft, $C^{22}$, lying in a horizontal plane and slightly oblique to a line perpendicular to the length of the machine and supported in a bearing, $C^{23}$, on the detachable forward extension, $C^5$, and a bearing, $C^{24}$, on the upright main portion of the neck, C. The bearing, $C^{23}$, is a block held in position by a housing, $C^{25}$, applied to the front of the upright portion of said extension, $C^5$. Said housing extends around the shaft, $C^{11}$, and covers the worm gear wheel, $C^{21}$, and the bearing, $C^{23}$. Near its right-hand end, the shaft, $C^{22}$, has a worm, $C^{26}$, meshing with a worm gear wheel, $C^{27}$, mounted on an upright shaft, $C^{28}$, resting in an upper bearing, $C^{29}$, and a lower bearing, $C^{30}$, the bearing, $C^{29}$, being in the upper forward extension, $C^5$, and the bearing, $C^{30}$, being in the main portion of the neck, C. The shaft, $C^{28}$, passes the left-hand end of the horizontal shaft, $C^{10}$, already described as resting in the bearing, $C^9$. On said end of the shaft, $C^{10}$, is a bevel gear wheel, $C^{31}$, having its teeth directed toward the shaft, $C^{28}$. On the shaft, $C^{28}$, at opposite sides of the bevel gear wheel, $C^{31}$, are two bevel gear wheels, $C^{32}$, which are directed toward each other and adapted to engage the bevel gear wheel, $C^{31}$. The wheels, $C^{32}$, are slidable endwise on the shaft, $C^{28}$, but are held against rotation on said shaft by a feather, $C^{33}$. A shift bar, $C^{34}$, engages both of said wheels to keep them at a fixed distance from each other and to make both movable in unison when the shift bar is moved parallel to the shaft, $C^{28}$. The distance between said wheels is such as to permit their seating to place either in engagement with the wheel, $C^{31}$, or to place both out of engagement with said wheel. On the shaft, $C^{10}$, is a worm, $C^{35}$, which engages a segmental worm gear wheel to be described farther on. The purpose of the shafts and gears as above described is to transmit motion from the shaft, $C^{11}$, to the worm, $C^{35}$, at reduced velocity and in either direction at the will of the operator.

It has already been described that the neck, C, is joined to the body, B, by placing the journal, $C^1$, in the bearing, $B^4$, in the front cross wall, $B^3$. This permits the turning of the neck, C, on the common axial line of the journal, $C^1$, shaft, $C^{11}$, bevel gear wheel, $C^{19}$, and the motor axle. The group of gearing last above described for transmitting motion from the shaft, $C^{11}$, to the worm, $C^{35}$, on the shaft, $C^{10}$, is so arranged as to maintain the same relation in whatever radial position the neck may hold on said common axial line, so that said worm, $C^{35}$, may be rotated in either direction, at the will of the operator, whatever such radial position of the neck may be and when said neck is rotating as well as when it is at rest.

Said neck is turned upon said common axial line by manually-actuated mechanism which will now be described.

At the left of the worm gear wheel, $C^2$, already described as being mounted on the inner rear end of the journal, $C^1$, is an upright shaft, $B^{29}$, resting in an upper bearing, $B^{30}$, and a lower bearing, $B^{31}$, the bearing, $B^{30}$, being formed in the top-plate, $B^7$, and the bearing, $B^{31}$, being formed in the bottom of the body, B. On the shaft, $B^{29}$, is a worm, $B^{32}$, engaging the worm wheel, $C^2$. Above the bearing, $B^{30}$, there is a socket, $B^{33}$, into which the upper end of the shaft, $B^{29}$, extends, and said end is squared to receive a socket wrench to be turned by the operator for turning the shaft, $B^{29}$, in either direction to turn the neck, C, into the desired position on said common axial line. When rotation of the shaft, $B^{29}$, ceases, the worm, $B^{32}$, on said shaft, serves as a lock for holding the worm wheel, $C^2$, and the neck immovably.

As above stated, the head, D, is supported by the neck. The head comprises a group of parts or members, the form and location and function of which will now be described.

The head is turnable through a range of 180 degrees on an axis which intersects and is perpendicular to the common horizontal axial line above described, (the axial line of the motor axle, $B^{12}$, and the transmisison axle, $C^{11}$) while motion is being transmitted to the cutting tool which is carried by the head. These facts call for certain structural peculiarities of the main members of the head.

The head comprises two main casting sections superposed and joined to each other. The lower section, $D^1$, has a horizontal bottom or floor, $D^3$, which has straight and parallel side edges and a rear edge formed semicircular with the axis of the bearing, $C^4$, of the neck, C, while as a center, each of the forward corners is rounded on a relatively short radius. On the axis of the bearing, $C^5$, said floor has an aperture or bearing, $D^4$, receiving the lower end of the bearing, $C^5$, so that said section is rotatable on the axial line of the bearing, $C^5$. At each side of the longitudinal plane of the machine, said section has an upright wall, $D^5$, rising to the full height of said section. At the upper edge of said wall is a horizontal, outward-directed flange, $D^6$.

The rear edges of said walls, $D^5$, support a wall, $D^7$, which is upright and U-shape in horizontal cross section and which has its upper edge extending to or approximately to the height of the walls, $D^5$. The lower edge of said wall remains high enough to clear said extension, $C^3$, of the neck, C. The rear portion of said wall is made semi-circular in horizontal cross section, the axis of the bearings, $C^5$ and $C^6$, being used for a center. The upper portion of the wall, $D^7$, is off-set inward to form a seat, $D^8$, to support a semi-circular worm rack, $D^9$, which meshes with the worm, $C^{35}$, mounted on the neck, as already described.

Said worm rack is secured to said wall $D^7$, by means of horizontal screw bolts, $D^{10}$, extending horizontally through said wall into said rack. By the turning of the worm, $C^{35}$, as already described, said rack and the head section, $D^1$, rotate on the axis of the bearings, $C^5$ and $C^6$, already described. The upper head section, $D^2$, is similar to the lower head section and has upright front walls, $D^{11}$, corresponding to the walls, $D^5$, of the lower head section and each having at its lower edge a flange, $D^{12}$, directed forward and laterally and resting upon the corresponding flange, $D^6$, of the lower head section. Said flanges are secured to each other by upright bolts, $D^{13}$, extending through said flanges. Said section comprises a top-plate, $D^{14}$, which is of the same general form as the floor or bottom, $D^3$, of the lower head section. On the axial line of the bearings, $C^5$ and $C^6$, said top-plate has a bearing, $D^{15}$, extending into the bearing, $C^6$, and receiving the upper end of an upright transmission shaft, $D^{16}$. Thus the completed head is made turnable on the bearings, $C^5$ and $C^6$. The top-plate, $D^{14}$, has a downward-directed marginal flange, $D^{17}$, bearing upon the upper forward extension, $C^4$, of the neck, C. Thus a support analogous to a turn-table is given to the head. To minimize lost motion and flexure, a binding plate, $D^{18}$, (Fig. 33) is placed flatwise upon the floor or bottom, $D^3$, of the lower head section and secured thereto by screws, $D^{19}$, and extended rearward around the bearing, $C^5$, and across the forward extension, $C^3$, and beneath a bracket, $D^{20}$, seated on the extension, $C^3$, the rear edge of said binding plate being made concentric with the bearing, $C^5$, so that when the head is turned on said axis, said edge will remain under said bracket.

The cutting tool and the members concerned with supporting and actuating the cutting tool are designated the tongue, E. In the forward portion of the head are two upright screw shafts, $D^{21}$ located at opposite sides of and equidistant from the middle upright longitudinal plane of the machine and rest in bearings, $D^{22}$, in the upper head section and in bearings, $D^{23}$, in the lower head section. Each of said shafts has at its upper end a spur gear wheel $D^{24}$, keyed to its shaft and meshing with an idle, intermediate spur gear wheel, $D^{25}$. A yoke plate, $D^{26}$, extends horizontally across the screw shafts and is penetrated by the necks of said shafts, so that said plate lies between the threads and the spur gear wheels of said shafts. At the middle of said plate is a bearing, $D^{27}$, which receives the lower end of the axle, $D^{28}$, of the idle spur gear, $D^{25}$, while the upper end of said shaft has a bearing $D^{29}$, in the upper head section. Around the extreme upper end of said shaft, said upper head section is counter-sunk and said shaft is squared to receive a wrench for turning said shaft at the will of the operator. When said shaft is turned, the idle spur gear wheel is turned, and the latter turns the spur gear wheels, $D^{24}$, and the screw shafts, the rotation of said shafts being in unison and in the same direction. The threads of the screw shafts are in the same direction and of equal size and pitch. Said screw shafts extend through the horizontal tongue block, $E^1$, which has threads to engage the threads of the screw shafts. When the screw shafts are rotated by the means above described, the tongue block is moved up or down, according to the direction of rotation of said shafts. A rotary cutting tool, $C^2$, is journaled in said tongue block in the upright middle longitudinal plane of the machine and in nearly the horizontal position, the front portion of the tool axis being a little lower than the rear end of said axis, in order that the lower side of the cutting portion of the tool (which is tapering) will be in the horizontal position. Around the journal portion, $E^3$, of said tool, is a bushing, $E^4$.

On the tongue block, $E^1$, is a rearward extended bearing, $E^5$, receiving the hub of a bevel gear wheel, $E^6$, surrounding the shaft, $D^{16}$, said wheel being below said bearing and meshing with a bevel gear wheel, $E^7$, mounted immovably on the inner end of the journal, $E^3$, of the cutting tool. The bevel gear wheel, $E^6$, is slidable on the shaft, $D^{16}$, but is held against rotation thereon by a feather, $E^8$; and the upper portion of the hub of said wheel has an annular outward-directed flange, $E^9$, by which engagement is made in the bearing, $E^5$, to prevent said wheel from moving downward away from the tongue block. Motion is imparted to the shaft, $D^{16}$, through the bevel gear wheel, $D^{30}$, which surrounds the upper portion of said shaft and is immovable thereon and meshes with the bevel gear wheel, $C^{19}$, on the shaft, $C^{11}$.

When the motor, $B^{11}$, is in action and the clutch members, $C^{12}$ and $C^{13}$, are in engagement, motion is transmitted through the several parts already described to the bevel gear wheel $E^7$, whereby the cutting tool is rotated. Such engagement remains undisturbed when the elevation of the cutting tool is changed by moving the tongue block, $E^1$, up or down by rotating the screw shafts as above described; for during such up or down movement of said block, the bevel gear wheel, $E^6$, slides on the shaft, $D^{16}$, but is held for rotation with said shaft.

Thus the tongue may be raised and lowered independently of any movement of the head or neck. Furthermore, the tongue may receive sidewise movement by the turning of the head, at the will of the operator, on the axis of the shaft, $B^{16}$, by the rotation of the horizontal worm shaft, $C^{10}$. Furthermore, the tongue may be given an orbital movement, at the will of the operator, by turning the worm gear wheel, $C^2$, and thereby turning the neck on the common axial line of the motor axle and the shaft, $C^{11}$, the revolutions of said tongue being around said longitudinal or common axial line.

The middle portion of the tongue block, $E^1$, is extended downward, and the adjacent portion of the lower head section is cut away sufficiently to bring the lower side of the cutting tool to the floor of the mine when the tongue block is in its lowest position. This permits the making of a kerf along the floor level—below the level of the track rails and the ties supporting the track rails.

When the machine is to be set for cutting along the floor level, the body, B, is to be lowered after the machine has been moved forward on the track rails far enough to bring the neck and head of the machine forward of the track rails. When the machine is in such position and is to be moved backward, the body of the machine must be first raised far enough to bring the neck and the parts supported thereby above the level of the track rails. When the neck is in position for cutting along the floor level and it is desired to turn the neck on its horizontal axis, the body of the machine must be lifted sufficiently to allow the neck and the parts supported thereby to clear the floor while the neck is being turned.

When there is sufficient head room for turning the neck, and the parts supported thereby, on the longitudinal axis of the machine, the body of the machine may be raised only enough to allow the lower portion of the neck and the head to clear the floor, the neck being then turned until no portion thereof is below the level of the track.

From the foregoing description, it will be seen that the cutting tool may be given a large variety of movements. Whatever position the tool occupies relative to the horizontal axis of the neck, the tool may be carried bodily forward and backward by moving the machine body forward and backward, and while the machine is so moving, the tool may be actuated for cutting and making a cut according to the position of the tool relative to the axis. Furthermore, the tool may at any time be swung back and forth sidewise in a plane which is tangential to a cylinder having for its axis the axis of the neck and having its diameter equal to twice the distance from the cutting tool to the axis of the neck. And said tangential plane may be brought nearer to or farther from said axial line by turning the pair of screw shafts whereby the tongue block is supported. The neck may be turned into any radial position on its axis and there secured and the cutting tool made to cut relative to said position. The head may also be turned on the shaft, $D^{16}$, to any position within its range, and secured in said position. And the tongue may be moved into any position on the screw shafts and held in such position. Furthermore, these various movements may be made simultaneously with varying velocity ratios. All these positions and movements permit cutting in almost every conceivable elevation and direction, including horizontal, upright, oblique, straight courses, and also in curved courses of practically unlimited variety.

I claim as my invention,

1. In a machine of the nature described, the combination of a rotatable neck having an axis which is relatively stationary and horizontal and parallel to the machine path, means for actuating said neck, a cutting tool, members supporting and at the will of the operator moving said tool on said neck at right angles to and toward and from the axial line of the neck and means extending along the axis of said neck for transmitting motion to said cutting tool independently of the movement of said supporting members, substantially as described.

2. In a machine of the nature described, the combination of a rotatable neck which is horizontal and parallel to the machine path, means for actuating said neck, a cutting tool, members supported by said neck and comprising a pair of parallel rotatable screws for supporting said tool on said neck for movement on the neck toward and from the axial line of the neck, and means for actuating said cutting tool, substantially as described.

3. In a machine of the nature described, the combination of a rotatable neck having an axis which is relatively stationary and horizontal and parallel to the machine path, means for actuating said neck, a cutting tool, members supporting and at the will of the operator moving said tool on said neck for movement at right angles to and toward and from the axial line of the neck, and means extending along the axis of said neck for transmitting motion to said cutting tool independently of the movement of said supporting members, substantially as described.

4. In a machine of the nature described, the combination of a rotatable neck which is horizontal and parallel to the machine path, means for actuating said neck, a cutting tool, members comprising a pair of parallel screws for supporting said tool on said neck for movement on the neck toward and from the axial line of the neck, and means extending through said neck for actuating said cutting tool, substantially as described.

5. In a machine of the nature described, the combination of a rotatable neck having an axis which is relatively stationary and horizontal and parallel to the machine path, means for actuating said neck, a cutting tool, members supporting and at the will of the operator moving said tool on said neck for movement at right angles to and toward and from the axial line of the neck and for swinging the tool on an axis which is forward of the neck and perpendicular to the neck axis, a motor seated on the body of the machine, and means for transmitting motion from the motor to said cutting tool, substantially as described.

6. In a machine of the nature described, the combination of a rotatable neck which is horizontal and parallel to the machine path, means for actuating said neck, a cutting tool, screw mechanism acting transversely to the axial line of the neck for supporting said tool on the neck for movement on the neck toward and from the axial line of the neck and for swinging the tool on an axis which is forward of the neck and perpendicular to the neck axis, and means for actuating said cutting tool, substantially as described.

7. In a machine of the nature described, the combination of a rotatable neck which is horizontal and parallel to the machine path, means for actuating said neck, a cutting tool, members comprising a pair of parallel screws for supporting said tool on said neck for movement on the neck toward and from the axial line of the neck and for swinging the tool on an axis which is forward of the neck and perpendicular to the neck axis, and means for actuating said cutting tool, substantially as described.

8. In a machine of the nature described, the combination of a rotatable neck having an axis which is relatively stationary and horizontal and parallel to the machine path, a cutting tool, members supporting said tool on said neck for movement at right angles to and toward and from the axial line of the neck, operator-controlled, mechanism carried by said neck for effecting said movement, and means extending along the axis of said neck for transmitting motion to said cutting tool independently of the movement of said supporting members, substantially as described.

9. In a machine of the nature described, the combination of a rotatable neck having an axis which is relatively stationary and horizontal and parallel to the machine path, a cutting tool, screw mechanism carried by said neck and acting transversely to the axial line of the neck for supporting and at the will of the operator moving said tool on the neck toward and from the axial line of the neck, a motor seated on the body of the machine, and means for transmitting motion from the motor to said cutting tool, substantially as described.

10. In a machine of the nature described, the combination of a rotatable neck which is horizontal and parallel to the machine path, a cutting tool, members carried by the neck and comprising a pair of parallel screws for supporting and at the will of the operator moving said tool on said neck toward and from the axial line of the neck, a motor seated on the body of the machine, and means for transmitting motion from the motor to said cutting tool, substantially as described.

11. In a machine of the nature described, the combination of a rotatable neck having an axis which is relatively stationary and horizontal and parallel to the machine path, a cutting tool, members supporting and at the will of the operator moving said tool on said neck at right angles to and toward and from the axial line of the neck, and means extending through said neck along the axial line of the latter for actuating said cutting tool independently of the movement of said supporting members, substantially as described.

12. In a machine of the nature described, the combination of a rotatable neck which is horizontal and parallel to the machine path, a cutting tool, members comprising a pair of parallel screws for supporting and at the will of the operator moving said tool on said neck toward and from the axial line of the neck, and means extending through said neck for actuating said cutting tool, substantially as described.

13. In a machine of the nature described, the combination of a rotatable neck having an axis which is relatively stationary and horizontal and parallel to the machine path, a cutting tool, members supporting and for at the will of the operator moving said tool on said neck at right angles to and toward and from the axial line of the neck and for swinging the tool on an axis which is forward of the neck and perpendicular to the neck axis, operator-controlled, power-driven mechanism for effecting said swinging movement, and means for actuating said cutting tool, substantially as described.

14. In a machine of the nature described, the combination of a rotatable neck which is horizontal and parallel to the machine path, a cutting tool, screw mechanism acting transversely to the axial line of the neck for supporting and at the will of the operator moving said tool on the neck toward and from the axial line of the neck and for swinging the tool on an axis which is forward of the neck and perpendicular to the neck axis, operator-controlled, power-driven mechanism for effecting said swinging movement, and means for actuating said cutting tool, substantially as described.

15. In a machine of the nature described, the combination of a rotatable neck which is horizontal and parallel to the machine path, a cutting tool, members comprising a pair of parallel screws for supporting and at the will of the operator moving said tool on said neck toward and from the axial line of the neck and for swinging the tool on an axis which is forward of the neck and perpendicular to the neck axis, operator-controlled, power-driven mechanism for effecting said swinging movement, and means for actuating said cutting tool, substantially as described.

16. In a machine of the nature described, the combination of a horizontal, rotatable neck, mechanism for turning said neck, members hinged to said neck on a hinge line which is transverse to the axial line of said neck, and a cutting tool supported by said members approximately at right angles to said hinge line and for movement parallel to said hinge line, and means for actuating said cutting tool, substantially as described.

17. In a machine of the nature described, the combination of a truck, a body supported by and vertically adjustable upon said truck, a motor on said body, telescoping transmission mechanism for transmitting power from said motor to a propulsion member of said truck, and cutting mechanism supported by said body forward of the latter, substantially as described.

18. In a machine of the nature described, the combination of a truck and a body having upright, inter-engaging guiding means, a motor on the body, screw mechanism on the body for imparting upright movement to said body, transmission means connecting said screw mechanism and said motor, and laterally-turnable cutting mechanism supported by said body forward of the latter, substantially as described.

19. In a machine of the nature described, the combination of a truck having traction wheels and a body having upright, inter-engaging guiding means, a motor on the body, screw mechanism on the body for imparting upright movement to said body, transmission means connecting said screw mechanism and said motor, adjustable transmission mechanism connecting said motor and said traction wheels, and laterally-turnable cutting mechanism supported by said body forward of the latter, substantially as described.

20. In a machine of the nature described, the combination of a body, a motor on said body, a head located on said body and rotatable on an axis which is horizontal and parallel to the course of travel of the machine, cutting mechanism supported by said head and adjustable thereon bodily toward and from said axis as far as the distance from said axis to the base of a track supporting the machine, transmission means extending from said motor along said axis into said head and thence to said cutting mechanism, and transmission means for transmitting motion from said motor to the wheels of said truck, substantially as described.

21. In a machine of the nature described, the combination of a body, a motor on said body, a head located on said body and rotatable on an axis which is horizontal and parallel to the course of travel of the machine, a rotary bar supported by said head and adjustable thereon bodily toward and from said axis as far as the distance from said axis to the base of a track supporting the machine, and transmission means extending from said motor along said axis into said head and thence to said rotary cutter bar, substantially as described.

22. In a machine of the nature described, the combination of a body, a motor on said body, a head located on said body and rotatable on an axis which is horizontal and parallel to the course of travel of the machine, a rotary cutter bar supported by said head and adjustable thereon bodily toward and from said axis as far as the distance from said axis to the base of a track supporting the machine, transmission means extending from said motor along said axis into said head and thence to said rotary cutter bar, and transmission means for transmitting motion from said motor to the wheels of said truck, substantially as described.

23. In a machine of the nature described, the combination of a truck, a body movable up and down on said truck and having cross-walls and side-walls and comprising a detachable top-plate, upright screws seated on the truck and engaging said top-plate, means for rotating said screws, cutting mechanism supported by said body, and means for actuating said cutting mechanism, substantially as described.

24. In a machine of the nature described, the combination of a truck, a body movable up and down on said truck and having cross-walls and side-walls and comprising a detachable top-plate, upright screws seated on the truck and engaging said top-plate, gearing on said top-plate for rotating said screws, cutting mechanism supported by said body, and means for actuating said cutting mechanism, substantially as described.

25. In a machine of the nature described, the combination of a body having a forward, upright cross-wall recessed at its upper edge to form the lower portion of a bearing, a top-plate having at its front edge a downward extension standing above said recess and being upwardly recessed to form the upper portion of a bearing, a neck having a horizontal journal resting in said bearing, means for rotating said journal and neck, cutting mechanism supported by said neck, and means for actuating said cutting mechanism, substantially as described.

26. In a machine of the nature described, the combination of a body having a forward, upright cross-wall recessed at its upper edge to form the lower portion of a bearing, a top-plate having at its front edge a downward extension standing above said recess of the cross-wall and being upwardly recessed to form the upper portion of a bearing, a neck having a horizontal journal resting in said bearing, means for rotating said journal and neck, cutting mechanism, and cutting mechanism actuating means comprising a shaft extending axially through and rotatable in said neck, substantially as described.

27. In a machine of the nature described, the combination of a body having a forward, upright cross-wall recessed at its upper edge to form the lower portion of a bearing, a top-plate having at its front edge a downward extension standing above the recess of said cross-wall and being upwardly recessed to form the upper portion of a bearing, a neck having a horizontal journal resting in said bearings, worm gearing for rotating said journal and neck, cutting mechanism supported by said neck, and means for actuating said cutting mechanism, substantially as described.

28. In a machine of the nature described, the combination with members forming a horizontal bearing, of a neck having a journal resting in said bearing and said neck having an integral, forward-directed extension in which is a bearing perpendicular to the axis of said neck and said neck having a detachable forward extension in which is a bearing axially in line with the bearing in the other forward extension, a head journaled in the bearings of said extensions, worm gearing for turning said head in said bearings, means for turning said journal and said neck, cutting mechanism supported by said head, and means for actuating said cutting mechanism, substantially as described.

29. In a machine of the nature described, members forming a horizontal bearing, a neck having a journal resting in said bearing and said neck having horizontal members each of which has a bearing in alinement with the other of said bearings and perpendicular to the axis of said journal, a head located between said members and journaled in said bearings, means for turning said head on its bearings, cutting mechanism perpendicular to the axial line of said bearings and adjustable on said head toward and from the axial line of said neck, and means for actuating said cutting mechanism, substantially as described.

30. In a machine of the nature described, members forming a horizontal bearing, a neck having a journal resting in said bearing and said neck having horizontal members each of which has a bearing in alinement with the other of said bearings and perpendicular to the axis of said journal, a head located between said members and journaled in said bearings, means for turning said journal in its bearings, hinged cutting mechanism perpendicular to the axial line of said bearings and adjustable bodily on said head toward and from the axial line of said neck, and means for actuating said cutting mechanism, substantially as described.

31. In a machine of the nature described, the combination with members forming a horizontal bearing, of a neck having a journal resting in said bearing and said neck having an integral, forward-directed extension in which is a bearing perpendicular to the axis of said neck and said neck having a detachable forward extension in which is a bearing axially in line with the bearing in the other forward extension, a head journaled in the bearings of said extensions, means for turning said journal and neck, hinged cutting mechanism perpendicular to the axial line of said bearings and bodily adjustable on said head toward and from the axial line of said neck, and means for actuating said cutting mechanism, substantially as described.

32. In a machine of the nature described, members forming a horizontal bearing, a neck having a journal resting in said bearing, said neck having horizontal members each of which has a bearing in alinement with the other of said bearings and perpendicular to the axis of said journal, a head located between said members and journaled in said bearings, means for turning said journal in its bearings, hinged cutting mechanism perpendicular to the axial line of said bearings and adjustable bodily on said head toward and from the axial line of said neck farther than the distance of the supporting faces of the machine from the axial line of said neck, and means for actuating said cutting mechanism, substantially as described.

33. In a machine of the nature described, the combination with members forming a horizontal bearing, of a neck having a journal resting in said bearing and said neck having an integral, forward-directed extension in which is a bearing perpendicular to the axis of said neck and said neck having a detachable forward extension in which is a bearing axially in line with the bearing in the other forward extension, a head journaled in the bearings of said extensions, means for turning said journal and neck, hinged cutting mechanism perpendicular to the axial line of said bearings and adjustable bodily on said head toward and from the axial line of said neck farther than the distance of the supporting faces of the machine from the axial line of said neck, and means for actuating said cutting mechanism, substantially as described.

34. In a machine of the nature described, members forming a horizontal bearing, a neck having a journal resting in said bearing and said neck having horizontal members each of which has a bearing in alinement with the other of said bearings and perpendicular to the axis of said journal, a head located between said members and journaled in said bearings, means for turning said journal in its bearing for adjustment toward and from the axis of said horizontal bearing, cutting mechanism perpendicular to the axial line of said bearings and supported adjustably by said head, and mechanism for actuating said cutting mechanism, substantially as described.

35. In a machine of the nature described, the combination with members forming a horizontal bearing, of a neck having a journal resting in said bearing and said neck having an integral, forward-directed extension in which is a bearing perpendicular to the axis of said neck and said neck having a detachable forward extension in which is a bearing axially in line with the bearing in the other forward extension, a head located between said extensions and journaled in the bearings of said extensions, means for turning said journal and neck, cutting mechanism perpendicular to the axial line of said bearings and supported by said head for adjustment toward and from the axis of said horizontal bearing, and means for actuating said cutting means, substantially as described.

36. In a machine of the nature described, the combination of a head comprising an upper section and a lower section joined to each other at their meeting edges, means journaling said head on an axis perpendicular to the length of said machine, worm gearing for turning said head on said perpendicular axis, cutting mechanism perpendicular to the axial line of said bearings and supported by said head for adjustment toward and from the axis of said horizontal bearing, and means for actuating said cutting mechanism, substantially as described.

37. In a machine of the nature described, the combination of a head comprising an upper section and a lower section joined to each other at their meeting edges, means journaling said head on an axis perpendicular to the length of said machine, worm gearing for turning said head on said perpendicular axis, cutting mechanism perpendicular to the axial line of said bearings and supported by said head and bodily adjustable thereon toward and from a line cutting said perpendicular axis perpendicularly, and means for actuating said cutting mechanism, substantially as described.

38. In a machine of the nature described, the combination of a head comprising an upper section and a lower section joined to each other at their meeting edges, means journaling said head on an axis which is perpendicular to the length of said machine, worm gearing for turning said head on said perpendicular axis, a motor on the machine in operative relation with said worm gearing, cutting mechanism supported by said head for adjustment parallel to the axis on which said head is journaled, and means for actuating said cutting mechanism, substantially as described.

39. In a machine of the nature described, the combination of a head comprising an upper section and a lower section joined to each other at their meeting edges, means journaling said head on an axis which is perpendicular to the length of said machine, worm gearing for turning said head on said perpendicular axis, a motor on the machine in operative relation with said worm gearing, cutting mechanism supported by said head and bodily adjustable thereon toward and from a line cutting said perpendicular axis perpendicularly, operator-controlled, power mechanism for making said adjustment and means for actuating said cutting mechanism, substantially as described.

40. In a machine of the nature described, a head rotatable on an axis which is parallel to the length of the machine, a pair of screw shafts located on the head perpendicular to the course of travel of the machine, a tongue block threaded to said screw shafts, means for rotating said screw shafts, cutting mechanism supported by said tongue block, and means for actuating said cutting mechanism, substantially as described.

41. In a machine of the nature described, a head rotatable on an axis which is parallel to the length of the machine, a pair of screw shafts located on said head perpendicular to the course of travel of the machine, a tongue block threaded to said screw shafts, means for rotating said screw shafts, cutting mechanism supported by said tongue block below the attachment of said block to said screw shafts, and means for actuating said cutting mechanism, substantially as described.

42. In a machine of the nature described, a head rotatable on an axis which is parallel to the length of the machine, a pair of screw shafts supported on said head perpendicular to the course of travel of the machine, a tongue block threaded to said screw shafts, and adapted to extend below the supporting faces of the machine, means for rotating said screw shafts, cutting mechanism supported by said tongue block, and means for actuating said cutting mechanism, substantially as described.

43. In a machine of the nature described, a head rotatable on an axis which is parallel to the length of the machine, a pair of screw shafts located on said head perpendicular to the course of travel of the machine, a tongue block threaded to said screw shafts, and having a middle downward extension, means for rotating said screw shafts, cutting mechanism supported by said extension, and means for actuating said cutting mechanism, substantially as described.

44. In a machine of the nature described, a group of members bodily rotatable on a main horizontal, relatively stationary axis, said group of members comprising a head journaled on an axis which is perpendicular to said main horizontal axis, a transmission shaft in said perpendicular axis, means for rotating said transmission shaft, guiding and supporting means distinct from and parallel and adjacent to said perpendicular axis, cutting means applied to said guiding and supporting means and adjustable thereon toward and from said main horizontal axis, and actuating means extending from said transmission shaft to said cutting mechanism, substantially as described.

45. In a machine of the nature described, a supporting frame, a group of members bodily rotatable on a main horizontal axis, said group of members comprising a head journaled on an axis which is perpendicular to said main horizontal axis, a transmission shaft on said perpendicular axis, means for rotating said transmission shaft, a rotary cutting bar on said head and adjustable toward and from said main horizontal axis, and actuating means extending from said transmission shaft to said cutting bar, substantially as described.

46. In a machine of the nature described, a supporting frame, a group of members bodily rotatable on a main horizontal, relatively stationary axis, said group of members comprising a head journaled on an axis which is perpendicular to said horizontal main axis, a transmission shaft on said perpendicular axis, means for rotating said transmission shaft, cutting mechanism on said head and adjustable toward and from said main horizontal axis, means slidable on and extending from said shaft to said cutting mechanism for actuating the latter, substantially as described.

47. In a machine of the nature described, a supporting frame, a group of members bodily rotatable on a main horizontal, relatively stationary axis, said group of members comprising a head journaled on an axis which is perpendicular to said horizontal axis, a transmission shaft on said perpendicular axis, means for rotating said transmission shaft, guiding and supporting means distinct from and parallel and adjacent to said perpendicular axis, cutting mechanism applied to said guiding and supporting means and adjustable thereon toward and from said main horizontal axis and adapted to work in planes parallel to said axis, actuating means extending from said transmission shaft to said cutting mechanism, and means for transmitting power to said perpendicular transmission shaft, substantially as described.

48. In a machine of the nature described, a supporting frame, a group of members bodily rotatable on a main horizontal relatively stationary axis, said group of members comprising a head journaled on an axis which is perpendicular to said main horizontal axis, a transmission shaft on said perpendicular axis, means for rotating said transmission shaft, cutting mechanism supported on said head and bodily adjustable thereon toward and from said main horizontal axis, means slidable on and extending from said shaft to said cutting mechanism for actuating the latter, and means on said main axis for transmitting power to said transmission shaft, substantially as described.

49. In a machine of the nature described, the combination of a rotatable neck which is horizontal and parallel to the machine path, a cutting tool, members supported on said neck and adapted to support the cutting tool at varying distances from the axial line of the neck, whereby the cutting tool may be carried through an orbital path by the rotation of said neck and the radius of said orbital path may be varied by varying the distance at which said members support said tool from the axial line of the neck, operator-controlled means for actuating said tool supporting members to vary said distance, and means extending along the axis of said neck for actuating said cutting tool, substantially as described.

50. In a machine of the nature described, the combination of a tool support rotatable on a horizontal axis, mechanism for effecting rotation of said support, a cutting tool, members supporting said tool on said support for movement toward and from the axial line of said support, means on said rotatable support for actuating said supporting members for moving said tool toward and from the axial line of the rotary support, and means extending along the axis of said support for actuating said cutting tool, substantially as described.

51. In a machine of the nature described, the combination of a tool support rotatable on a horizontal axis, mechanism for effecting rotation of said support, a cutting tool, members supporting said tool on said support for movement toward and from the axial line of said support and for swinging the tool in a plane parallel to said axial line, mechanisms on said rotatable support for actuating said supporting members for moving said tool toward and from the axial line of the rotary support and for swinging the tool in a plane parallel to said axial line, and means for actuating said cutting tool, substantially as described.

52. In a machine of the nature described, the combination of a rotary neck resting in a horizontal bearing, a rotary neck shaft in said neck on the axial line of the latter, cutting mechanism supported by said neck and arranged in operative relation with said neck shaft, a motor-driven transmission shaft placed in alinement with and end-to-end with said neck shaft, and clutch mechanism for connecting said transmission shaft and said neck shaft, substantially as described.

53. In a machine of the nature described, the combination of a rotary supporting body, an elongated cutting tool, means intervening said rotary body and the cutting tool for carrying the cutting tool in parallel relation to said axial line and for orbital movement around said line and from and toward and into said line, substantially as described.

54. In a machine of the nature described, the combination of a rotary supporting body on an axial line which is approximately coincident with the longitudinal center line of the machine, and an elongated cutting tool carried in parallel relation to said axial line and for orbital movement around said line and from and toward and into said line, substantially as described.

55. In a machine of the nature described, the combination of a rotary supporting body, an elongated cutting tool, means intervening said supporting body and the cutting tool for carrying the cutting tool in parallel relation to the axial line of the rotary supporting body into said axial line and from said line far enough to permit movement in an orbit larger than the transverse diameter of the machine, whereby said tool, intervening means, and supporting body are adapted to coöperate for cutting along said larger orbit and at all points within said larger orbit for the forming of a tunnel or entry of sufficient cross-section to receive said machine, substantially as described.

56. In a machine of the nature described, the combination of a rotary body, an elongated cutting tool, means intervening said supporting body and the cutting tool for carrying the cutting tool parallel to said axial line for orbital movement around said line and from and toward and into said line and for swinging the tool in a plane parallel to the axial line of the rotary body, substantially as described.

57. In a machine of the nature described, the combination of a rotary supporting body on an axial line which is approximately coincident with the longitudinal center line of the machine, an elongated cutting tool carried parallel to said axial line for orbital movement around said line and from and toward and into said line and to swing in a plane which is parallel to said axial line, substantially as described.

58. In a machine of the nature described, the combination of a rotary supporting body, an elongated cutting tool, means intervening said supporting body and said cutting tool for carrying the latter in planes parallel to the axial line of said supporting body for orbital movement around said line and from and toward and into said line, and means for actuating said cutting tool for cutting, substantially as described.

59. In a machine of the nature described, the combination of a rotary supporting body, an elongated cutting tool, means intervening said supporting body and said cutting tool for carrying the latter for orbital movement around said line and from and toward and into said line and to swing in planes parallel to the axial line of said supporting body, substantially as described.

60. In a machine of the nature described, the combination of a rotatable support which is horizontal and parallel to the machine path, means for turning said support, an elongated cutting tool, members supported on said support for carrying said tool parallel to and from and toward and into the axial line of said neck and in an orbital path which is concentric to said axial line and at any point in the orbit varying the angularity of the tool relative to said axial line, and means for actuating said cutting tool for cutting, substantially as described.

61. In a machine of the nature described, the combination of a rotatable support which is horizontal and parallel to the machine path, an elongated cutting tool, members supported by said support and supporting said cutting tool for movement from and toward and into the axial line of the rotatable support and for swinging the tool in a plane which is parallel to said axis, means for effecting said swinging movement, and means for actuating said tool for cutting, substantially as described.

62. In a machine of the nature described, the combination of an elongated cutting tool, means for supporting said tool parallel to the machine path and to carry said tool in such parallel relation through orbital paths which are concentric to the middle, longitudinal line of the machine and which range in diameter from zero to the largest, which is of larger diameter than the transverse dimensions of the machine, and means for actuating said cutting tool for cutting, substantially as described.

63. In a machine of the nature described, the combination of an elongated cutting tool, means for supporting said tool parallel to the machine path and to carry said tool in such parallel relation through orbital paths which are concentric to the middle longitudinal line of the machine and which range in diameter from zero to the largest, which is of larger diameter than the transverse dimensions of the machine, and to swing said tool in planes which are parallel to the axial line of the orbital paths, and means for actuating said cutting tool for cutting, substantially as described.

In testimony whereof I have signed my name this 3rd day of May, in the year one thousand nine hundred and sixteen.

CYRUS S. OLDROYD.